United States Patent
Zhamu et al.

(10) Patent No.: US 10,593,932 B2
(45) Date of Patent: *Mar. 17, 2020

(54) PROCESS FOR METAL-SULFUR BATTERY CATHODE CONTAINING HUMIC ACID-DERIVED CONDUCTIVE FOAM

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/270,868

(22) Filed: Sep. 20, 2016

(65) Prior Publication Data

US 2018/0083266 A1    Mar. 22, 2018

(51) Int. Cl.
*H01M 4/00* (2006.01)
*H01M 4/1397* (2010.01)
(Continued)

(52) U.S. Cl.
CPC ....... *H01M 4/1397* (2013.01); *H01M 4/0416* (2013.01); *H01M 4/13* (2013.01); *H01M 4/136* (2013.01); *H01M 4/139* (2013.01); *H01M 4/38* (2013.01); *H01M 4/5815* (2013.01); *H01M 4/663* (2013.01); *H01M 4/808* (2013.01); *H01M 10/052* (2013.01); *H01M 10/054* (2013.01); *H01M 2004/028* (2013.01)

(58) Field of Classification Search
CPC ....... H01M 4/00; H01M 10/00; Y10T 428/00; C01B 31/00; B82Y 40/00; C08H 6/00; H01G 11/00
See application file for complete search history.

(56) References Cited

U.S. PATENT DOCUMENTS 6,872,330 B2   3/2005   Mack et al.
6,913,154 B2   7/2005   Koslow
(Continued)

FOREIGN PATENT DOCUMENTS

CN    1230972 A    10/1999
CN    103641117 A    3/2014
(Continued)

OTHER PUBLICATIONS

"Humic Acid-Derived Mesoporous Carbon as Cathode Component for Lithium-Sulfur Battery", P. Półrolniczak, K. Wasiński, M. Walkowiak, Int. J. Electrochem. Sci., 10 (2015) pp. 9370-9378.*
(Continued)

*Primary Examiner* — Gordon Baldwin
*Assistant Examiner* — Mohammad Mayy

(57) ABSTRACT

Provided is a process for producing a sulfur cathode for a metal-sulfur battery. The process comprises: (a) Preparing a humic acid-derived foam or combined humic acid/graphene-derived foam composed of multiple pores and pore walls, wherein the pore walls contain one or a plurality of hexagonal carbon atomic planes; and (b) Impregnating the foam with sulfur or sulfide in a form of thin particles or coating, having a diameter or thickness less than 500 nm, which are lodged in the pores or deposited on the pore walls of the foam.

17 Claims, 10 Drawing Sheets

(51) Int. Cl.

| | | |
|---|---|---|
| *H01M 4/04* | (2006.01) | |
| *H01M 4/66* | (2006.01) | |
| *H01M 4/13* | (2010.01) | |
| *H01M 4/38* | (2006.01) | |
| *H01M 4/139* | (2010.01) | |
| *H01M 4/136* | (2010.01) | |
| *H01M 4/80* | (2006.01) | |
| *H01M 4/58* | (2010.01) | |
| *H01M 4/02* | (2006.01) | |
| *H01M 10/054* | (2010.01) | |
| *H01M 10/052* | (2010.01) | |

(56) References Cited

U.S. PATENT DOCUMENTS

| | | |
|---|---|---|
| 7,071,258 B1 | 7/2006 | Jang et al. |
| 7,327,000 B2 | 2/2008 | DeHeer et al. |
| 7,623,340 B1 | 11/2009 | Song et al. |
| 7,948,739 B2 | 5/2011 | Zhamu et al. |
| 9,053,870 B2 | 6/2015 | Yu et al. |
| 9,233,850 B2 | 1/2016 | Jang et al. |
| 9,437,372 B1 | 9/2016 | Zhamu et al. |
| 2005/0271574 A1 | 12/2005 | Jang et al. |
| 2008/0048152 A1 | 2/2008 | Jang et al. |
| 2009/0061312 A1 | 3/2009 | Zhamu et al. |
| 2009/0095942 A1 | 4/2009 | Yamaguchi et al. |
| 2010/0021819 A1 | 1/2010 | Zhamu et al. |
| 2011/0165321 A1* | 7/2011 | Zhamu .......... B82Y 30/00 427/79 |
| 2011/0165466 A1 | 7/2011 | Zhamu et al. |
| 2011/0201739 A1* | 8/2011 | Beall ............ B82Y 30/00 524/325 |
| 2011/0243830 A1 | 10/2011 | Ozaki et al. |
| 2012/0021250 A1 | 1/2012 | Lee et al. |
| 2012/0088154 A1 | 4/2012 | Liu et al. |
| 2013/0095389 A1 | 4/2013 | Bhardwaj et al. |
| 2013/0112925 A1 | 5/2013 | Beall |
| 2013/0141774 A1 | 6/2013 | McCarthy |
| 2013/0171339 A1 | 7/2013 | Wang et al. |
| 2014/0030636 A1 | 1/2014 | Zhao et al. |
| 2014/0234702 A1 | 8/2014 | Zhang et al. |
| 2014/0335420 A1 | 11/2014 | Yamamoto et al. |
| 2015/0044364 A1 | 2/2015 | Katayama et al. |
| 2015/0084603 A1 | 3/2015 | Thillaiyan et al. |
| 2015/0086881 A1 | 3/2015 | Zhamu et al. |
| 2015/0118554 A1 | 4/2015 | Wu et al. |
| 2015/0218003 A1* | 8/2015 | Zhamu .......... C01B 31/0476 428/220 |
| 2016/0240840 A1 | 8/2016 | He et al. |

FOREIGN PATENT DOCUMENTS

| | | | | |
|---|---|---|---|---|
| CN | 104600320 | A | 5/2015 | |
| CN | 103752281 | B | 4/2016 | |
| CN | 104900876 | B | 5/2017 | |
| GB | 317496 | A | * 8/1929 | ........... C08L 95/005 |
| JP | 58117649 | | 7/1983 | |
| WO | 2012151880 | A1 | 11/2012 | |

OTHER PUBLICATIONS

Duraia et al., "Reduced humic acid nanosheets and its uses as nanofiller" J. Phys. Chem. Solids (2015) vol. 85, pp. 86-90.*
Katsumi et al., "Evaluation of stacking nanostructure in soil humic acids by analysis of the 002 band of their X-ray diffraction profiles" Soil Science and Plant Nutrition (2015) vol. 61, No. 4, pp. 603-612.
PCT/US17/43619 International Search Report and Written Opinion dated Oct. 18, 2017, 18 pages.
Wunderwald et al., "Formation and degradation of a synthetic humic acid derived from 3-fluorocatechol" Applied Microbiology and Biotechnology (2000) vol. 53, No. 4, p. 441.
Xi et al., "Binder free three-dimensional sulphur/few-layer graphene foam cathode with enhanced high-rate capability for rechargeable lithium sulphur batteries" Nanoscale (2014) vol. 6, No. 11, pp. 5746-5753.
Xiulei Ji, Kyu Tae Lee, & Linda F. Nazar, "A highly ordered nanostructured carbon-sulphur cathode for lithium-sulphur batteries," Nature Materials 8, 500-506 (2009).
CN 103641117a, Google Patent English language translation, 5 pages.
CN 103752281B, Google Patent English language translation, 8 pages.
CN 104600320A Google Patent English Translation, 6 pages.
CN 1230972A, Google Patents English language translation, 22 pages.
Hummers, "Preparation of graphitic oxide" J. Am. Chem. Soc. (1958) vol. 80, p. 1339.
Jang et al., "Processing of Nano Graphene Platelets (NGPs) and NGP Nanocomposites: A Review" J. Materials Sci. (2008) vol. 43, pp. 5092-5101.
PCT/US17/18708 International Search Report and Written Opinion dated Jun. 6, 2017, 12 pages.
PCT/US17/36032 International Search Report and Written Opinion dated Aug. 25, 2017, 11 pages.
Porada et al., "Review on the science and technology of water desalination by capacitive deionization" Progress in Materials Science (2013) vol. 58, pp. 1388-1442.
Stevenson, Humus Chemistry: Genesis, Composition, Reactions (1982) pp. 258-263, John Wiley & Sons, New York.
U.S. Appl. No. 15/243,589 Nonfinal Office Action dated Nov. 16, 2017, 8 pages.
U.S. Appl. No. 15/243,589 Response Nonfinal Office Action dated Nov. 22, 2017, 11 pages.
U.S. Appl. No. 15/251,849 Nonfinal Office Action dated Nov. 1, 2017, 21 pages.
U.S. Appl. No. 15/270,868 Nonfinal Office Action dated Nov. 1, 2017, 23 pages.
Xu et al., "Self-Assembled Graphene Hydrogel via a One-Step Hydrothermal Process" ACS Nano (2010) vol. 4, No. 7, pp. 4324-4330.
Yang et al., "Two-dimensional Graphene Nano-ribbons" J. Am. Chem. Soc. (2008) vol. 130, pp. 4216-4217.

* cited by examiner

PROCESS FOR METAL-SULFUR BATTERY CATHODE CONTAINING HUMIC ACID-DERIVED CONDUCTIVE FOAM

FIELD OF THE INVENTION

The present invention is directed at a unique cathode composition and structure in a metal-sulfur battery, including the lithium-sulfur battery, sodium-sulfur battery, magnesium-sulfur battery, and aluminum-sulfur battery. The cathode of such a battery contains sulfur- or sulfide-impregnated conductive foam derived from humic acid. The invention also provides a process for producing such a cathode.

BACKGROUND OF THE INVENTION

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition metal oxide- or phosphate-based cathode active material is typically in the range of 140-170 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16$ Li $8Li_2S$ that lies near 2.2 V with respect to $Li^+/Li^0$. This electrochemical potential is approximately ⅔ of that exhibited by conventional positive electrodes (e.g. $LiMnO_4$). However, this shortcoming is more than offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, the values of energy densities can approach 2,500 Wh/kg and 2,800 Wh/l, respectively, based on the combined Li and S weight or volume. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-400 Wh/kg (based on the total cell weight), which is far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.

(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.

(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.

(4) More generally speaking, a significant drawback with cells containing cathodes comprising elemental sulfur, organosulfur and carbon-sulfur materials relates to the dissolution and excessive out-diffusion of soluble sulfides, including polysulfides, organo-sulfides, carbon-sulfides, and carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still falls short of what is required for practical applications.

For instance, Ji, et al reported that cathodes based on nanostructured sulfur/meso-porous carbon materials could overcome these challenges to a large degree, and exhibit stable, high, reversible capacities with good rate properties and cycling efficiency [Xiulei Ji, Kyu Tae Lee, & Linda F. Nazar, "A highly ordered nanostructured carbon-sulphur cathode for lithium-sulphur batteries," *Nature Materials* 8, 500-506 (2009)]. However, the fabrication of the proposed highly ordered meso-porous carbon structure requires a tedious and expensive template-assisted process. It is also challenging to load a large proportion of sulfur into these meso-scaled pores using a physical vapor deposition or solution precipitation process.

Zhang, et al. (US Pub. No. 2014/0234702; Aug. 21, 2014) makes use of a chemical reaction method of depositing S particles on surfaces of isolated graphene oxide (GO) sheets. But, this method is incapable of creating a large proportion of S particles on GO surfaces (i.e. typically <66% of S in the GO-S nanocomposite composition). The resulting Li—S cells also exhibit poor rate capability; e.g. the specific capacity of 1,100 mAh/g (based on S weight) at 0.02 C rate is reduced to <450 mAh/g at 1.0 C rate. It may be noted that the highest achievable specific capacity of 1,100 mAh/g represents a sulfur utilization efficiency of only 1,100/1, 675=65.7% even at such a low charge/discharge rate (0.02 C means completing the charge or discharge process in 1/0.02=50 hours; 1 C=1 hour, 2 C=½ hours, and 3 C=⅓ hours, etc.) Further, such a S-GO nanocomposite cathode-based Li—S cell exhibits very poor cycle life, with the capacity typically dropping to less than 60% of its original capacity in less than 40 charge/discharge cycles. Such a short cycle life makes this Li—S cell not useful for any practical application. Another chemical reaction method of depositing S particles on graphene oxide surfaces is disclosed by Wang, et al. (US Pub. No. 2013/0171339; Jul. 4, 2013). This Li—S cell still suffers from the same problems.

A solution precipitation method was disclosed by Liu, et al. (US Pub. No. 2012/0088154; Apr. 12, 2012) to prepare graphene-sulfur nanocomposites (having sulfur particles adsorbed on GO surfaces) for use as the cathode material in a Li—S cell. The method entails mixing GO sheets and S in a solvent ($CS_2$) to form a suspension. The solvent is then evaporated to yield a solid nanocomposite, which is then ground to yield nanocomposite powder having primary sulfur particles with an average diameter less than approximately 50 nm. Unfortunately, this method does not appear to be capable of producing S particles less than 40 nm. The resulting Li—S cell exhibits very poor cycle life (a 50% decay in capacity after only 50 cycles). Even when these nanocomposite particles are encapsulated in a polymer, the Li—S cell retains less than 80% of its original capacity after 100 cycles. The cell also exhibits a poor rate capability (specific capacity of 1,050 mAh/g(S wt.) at 0.1 C rate, dropped to <580 mAh/g at 1.0 C rate). Again, this implies that a large proportion of S did not contribute to the lithium storage, resulting in a low S utilization efficiency.

Furthermore, all of the aforementioned methods involve depositing S particles onto surfaces of isolated graphene sheets. The presence of S particles or coating (one of the most insulating materials) adhered to graphene surfaces would make the resulting electrode structure non-conducting when multiple S-bonded graphene sheets are packed together. These S particles prevent graphene sheets from contacting each other, making it impossible for otherwise conducting graphene sheets to form a 3-D network of electron-conducting paths in the cathode. This unintended and unexpected outcome is another reason why these prior art Li—S cells have performed so poorly.

Despite the various approaches proposed for the fabrication of high energy density Li—S cells, there remains a need for cathode materials, production processes, and cell operation methods that retard the out-diffusion of S or lithium polysulfide from the cathode compartments into other components in these cells, improve the utilization of electroactive cathode materials (S utilization efficiency), and provide rechargeable Li—S cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na), potassium metal (K), magnesium metal (Mg), and aluminum metal (Al) have similar chemical characteristics to Li, and the sulfur cathode in room temperature sodium-sulfur cells (RT Na—S batteries), potassium-sulfur cells (K—S), magnesium-sulfur cell, and aluminum-sulfur cell face the same issues observed in Li—S batteries, such as: (i) low active material utilization rate, (ii) poor cycle life, and (iii) low Coulombic efficiency. Again, these drawbacks arise mainly from insulating nature of S, dissolution of S and metal polysulfide intermediates in liquid electrolytes (and related Shuttle effect), and large volume changes during charge/discharge.

Hence, an object of the present invention is to provide a rechargeable metal-sulfur battery (e.g. Li—S, Na—S, K—S, Mg—S, or Al—S battery) that exhibits an exceptionally high specific energy density or high volumemetric energy density. One particular technical goal of the present invention is to provide a metal-sulfur or metal ion-sulfur cell with a cell specific energy greater than 400 Wh/Kg, preferably greater than 500 Wh/Kg, and more preferably greater than 600 Wh/Kg (all based on the total cell weight).

Another object of the present invention is to provide a metal-sulfur cell that exhibits a high cathode specific capacity (higher than 1,200 mAh/g based on the sulfur weight, or higher than 1,000 mAh/g based on the cathode composite weight, including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S or Na—S cells. For practical use purposes, it is more meaningful to use the cathode composite weight-based capacity value.

A specific object of the present invention is to provide a rechargeable metal-sulfur cell based on rational materials and battery designs that overcome or significantly reduce the following issues commonly associated with conventional metal-S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or metal polysulfides; (c) dissolution of S and metal polysulfide in electrolyte and migration of polysulfides from the cathode to the anode (which irreversibly react with Li, Na, K, Mg, or Al at the anode), resulting in active material loss and capacity decay (the shuttle effect); and (d) short cycle life.

Additionally, the production of graphene sheets typically involves the use of undesirable chemicals, such as sulfuric acid and potassium permanganate, and the efflux of regulated gases, such as $SO_2$ and $NO_2$. FIG. 1 illustrates a commonly used process for graphene production. Thus, an urgent need exists to have a new class of carbon nano materials that are comparable or superior to graphene in terms of properties, but can be produced more cost-effectively, faster, more scalable, and in a more environmentally benign manner. The production process for such a new carbon nano material requires a reduced amount of undesirable chemical (or elimination of these chemicals all together), shortened process time, less energy consumption, reduced or eliminated effluents of undesirable chemical species into the drainage (e.g., sulfuric acid) or into the air (e.g., $SO_2$ and $NO_2$). Furthermore, one should be able to readily make this new nano material into a foam structure that is essentially a 3D network of electron-conducting pathways and, hence, thermally and electrically conductive.

Generally speaking, a foam or foamed material is composed of pores (or cells) and pore walls (a solid material). The pores can be interconnected to form an open-cell foam. As an example, graphene foam is composed of pores and pore walls that contain a graphene material. We envision that graphene, when made into a foam structure, may be a good protective material for sulfur. However, most of the methods of producing graphene foams are all tedious, energy-intensive, and slow. Every prior art method or process for producing graphene and graphene foams has major deficiencies. Thus, it is an object of the present invention to provide a new class of foam material that is thermally and electrically conducting, mechanically robust, and chemically compatible with sulfur or polysulfide. Another object is to provide a cost-effective method of producing this class of foam to protect sulfur or polysulfide.

Humic acid (HA) is an organic matter commonly found in soil and coal products. HA can be extracted from the soil using a base (e.g. KOH). HA can also be extracted, with a high yield, from a type of coal called leonardite, which is a highly oxidized version of lignite coal. HA extracted from leonardite contains a number of oxygenated groups (e.g. carboxyl groups) located around the edges of the graphene-like molecular center ($SP^2$ core of hexagonal carbon structure). This material is slightly similar to graphene oxide (GO) which is produced by strong acid oxidation of natural graphite. HA has a typical oxygen content of 5% to 42% by weight (other major elements being carbon and hydrogen). HA, after chemical or thermal reduction, has an oxygen content of 0.01% to 5% by weight. For claim definition purposes in the instant application, humic acid (HA) refers to the entire oxygen content range, from 0.01% to 42% by weight. The reduced humic acid (RHA) is a special type of HA that has an oxygen content of 0.01% to 5% by weight.

The present invention is directed at a new class of graphene-like 2D materials (i.e. humic acid) that surprisingly can be converted into a foamed structure of high structural integrity. Thus, another object is to provide a cost-effective process for producing such a nano carbon foam (specifically, humic acid-derived foam) in large quantities. This process does not involve the use of an environmentally unfriendly chemical. This method enables the flexible design and control of the porosity level and pore sizes.

It is another object of the present invention to provide a humic acid-derived foam that exhibits a thermal conductivity, electrical conductivity, elastic modulus, and/or strength comparable to or greater than those of the conventional graphite foams, carbon foams, or graphene foams. Yet another object of the present invention is to provide a humic acid-derived foam that preferably has a meso-scaled pore size range (2-50 nm). The HA-derived foams must also be capable of retaining, confining, or protecting sulfur or sulfide to solve metal-sulfur cell issues.

SUMMARY OF THE INVENTION

The invention provides a process for producing sulfur cathode for a metal-sulfur battery. The process comprises: (a) Preparing a humic acid-derived foam or combined humic acid/graphene-derived foam composed of multiple pores and pore walls, wherein the pore walls contain one or a plurality of hexagonal carbon atomic planes; and (b) Impregnating the foam with sulfur or sulfide in a form of thin particles or coating, having a diameter or thickness less than 500 nm, which are lodged in the pores or deposited on the pore walls.

The present invention also provides a sulfur cathode for a metal-sulfur battery (a primary battery or secondary battery). The sulfur cathode contains a humic acid-derived foam or combined humic acid/graphene-derived foam, composed of multiple pores and pore walls, and sulfur or sulfide impregnated into the pores or deposited on the pore walls, wherein the pore walls contain single-layer or few-layer humic acid-derived hexagonal carbon atomic planes or sheets. The few-layer hexagonal carbon atomic planes or sheets have 2-10 layers of stacked hexagonal carbon atomic planes having an inter-plane spacing $d_{002}$ from 0.3354 nm to 0.60 nm as measured by X-ray diffraction. The single-layer or few-layer hexagonal carbon atomic planes contain 0.01% to 25% by weight of non-carbon elements, wherein the humic acid is selected from oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, or a combination thereof. The sulfide may be selected from a polysulfide, organo-sulfide, carbon-sulfide, metal polysulfide, carbon-polysulfide, or a combination thereof. The graphene may be selected from pristine graphene, graphene oxide, reduced graphene oxide, graphene fluoride, nitrogenated graphene, doped graphene, or chemically functionalized graphene.

Preferably, the sulfur or sulfide is chemically bonded to the humic acid-derived or combined humic acid/graphene-derived hexagonal carbon atomic planes. The sulfur or sulfide impregnated into the pores or deposited on the pore walls are preferably in a particle or coating form having a diameter or thickness less than 20 nm, more preferably less than 10 nm, and further preferably less than 5 nm, and can be as thin as 0.5-2 nm.

Preferably, the sulfur or sulfide occupies a weight fraction of at least 70% of the total weight of the foam and the sulfur or sulfide combined. This weight fraction is preferably at least 80%, more preferably at least 90%, and most preferably at least 95%.

In the sulfur cathode, the sulfide preferably contains a metal polysulfide selected from lithium polysulfide, sodium polysulfide, potassium polysulfide, magnesium polysulfide, aluminum polysulfide, or a combination thereof. In some embodiments, polysulfide contains a metal polysulfide, $M_xS_y$, wherein x is an integer from 1 to 3 and y is an integer from 1 to 10, and wherein M is a metal element selected from an alkali metal, an alkaline metal selected from Mg or Ca, a transition metal, a metal from groups 13 to 17 of the periodic table, or a combination thereof.

The humic acid-derived foam in the sulfur cathode herein invented can be divided into three types: (a) humic acid (HA) foams that contain at least 10% by weight (typically from 10% to 42% by weight and most typically from 10% to 25%) of non-carbon elements that can be used for a broad array of applications (wherein the original humic acid molecules remain substantially the same, but some chemical linking between HA molecules has occurred); (b) a chemically merged and reduced humic acid-based foam wherein extensive linking and merging between original HA molecules has occurred to form incipient graphene-like hexagonal carbon sheets constituting pore walls, resulting in evolution of chemical species containing non-carbon elements originally attached to HA molecules (hence, non-carbon element content reduced to generally between 2% and 10% by wt.); and (c) humic acid-derived graphitic foam that contains essentially all carbon only (<2% by weight of non-carbon content, preferably <1%, and further preferably <0.1%), wherein the pore walls contain single-layer or few-layer (2-10) graphene-like sheets that are hexagonal carbon atomic planes. In each and every one of these types, a graphene material can be added to humic acid and both humic acid and graphene are subsequently subjected to essentially the same heat treatments. This graphene material may be selected from pristine graphene, graphene oxide, reduced graphene oxide, graphene fluoride, nitrogenated graphene, doped graphene, or chemically functionalized graphene.

Preferably and typically, the HA-derived foam, when measured without the sulfur or sulfide, has a density from 0.005 to 1.7 g/cm$^3$, a specific surface area from 50 to 3,200 m$^2$/g, a thermal conductivity of at least 100 W/mK per unit of specific gravity, and/or an electrical conductivity no less than 500 S/cm per unit of specific gravity. More typically, the humic acid-derived foam has a density from 0.01 to 1.5 g/cm$^3$ or an average pore size from 2 nm to 50 nm. In an embodiment, the foam has a specific surface area from 200 to 2,000 m$^2$/g or a density from 0.1 to 1.3 g/cm$^3$.

Typically, if the HA-derived foam is produced from a process that does not contain a heat treatment temperature (HTT) higher than 300° C., the foam has a content of non-carbon elements in the range of 10% to 42% by weight. The pore walls can still contain identifiable humic acid molecules that are sheet-like hexagonal carbon atomic structures. The non-carbon elements can include an element selected from oxygen, fluorine, chlorine, bromine, iodine, nitrogen, hydrogen, or boron. In a specific embodiment, the pore walls contain fluorinated humic acid and the foam contains a fluorine content from 0.01% to 25% by weight. In another embodiment, the foam contains an oxygen content from 0.01% to 25% by weight.

With a HTT higher than 300° C., neighboring HA molecules that are closely packed and well-aligned can be chemically linked together to form multi-ring aromatic structures that resemble incipient graphene-like hexagonal carbon atomic structures. As heat treatment continues, these highly aromatic molecules are merged together in an edge-to-edge manner to increase the length and width of graphene-like hexagonal planes and, concurrently, several hexagonal carbon planes can be stacked together to form multi-layer carbon atomic structures, similar to few-layer graphene structures. The inter-planar spacing is typically reduced to <<0.60 nm, more typically <0.40 nm. If the HTT is from 300° C. up to 1,500° C., one typically produces chemically merged and reduced humic acid-based foam, wherein extensive linking and merging between original HA molecules has occurred to form incipient graphene-like hexagonal carbon sheets that constitute pore walls. The non-carbon content in the foam is typically reduced to from 2% to 10%.

If the HTT is from 1,500° C. to 3,200° C. and the foam can become essentially a graphitic foam wherein the pore walls contain single-layer or few-layer graphene-like hexagonal carbon planes and the non-carbon content is reduced to less than 2% by wt.

In a preferred embodiment, the foam is made into a continuous-length roll sheet form (a roll of a continuous foam sheet) having a thickness no greater than 200 μm and a length of at least 1 meter long, preferably at least 2 meters, further preferably at least 10 meters, and most preferably at least 100 meters. This sheet roll is produced by a roll-to-roll process. There has been no prior art HA-derived graphene-like foam that is made into a sheet roll form.

In a preferred embodiment, the HA-derived foam has an oxygen content or non-carbon content less than 1% by weight, and the pore walls have stacked graphene-like planes having an inter-planar spacing less than 0.35 nm, a thermal conductivity of at least 200 W/mK per unit of specific gravity, and/or an electrical conductivity no less than 1,000 S/cm per unit of specific gravity.

In a further preferred embodiment, the HA-derived foam has an oxygen content or non-carbon content less than 0.1% by weight and said pore walls contain stacked graphene-like hexagonal carbon atomic planes having an inter-planar spacing less than 0.34 nm, a thermal conductivity of at least 250 W/mK per unit of specific gravity, and/or an electrical conductivity no less than 1,500 S/cm per unit of specific gravity.

In yet another preferred embodiment, the HA-derived foam has an oxygen content or non-carbon content no greater than 0.01% by weight and said pore walls contain stacked graphene-like planes having an inter-graphene spacing less than 0.336 nm, a mosaic spread value no greater than 0.7, a thermal conductivity of at least 300 W/mK per unit of specific gravity, and/or an electrical conductivity no less than 2,000 S/cm per unit of specific gravity.

In still another preferred embodiment, the HA-derived foam has pore walls containing stacked graphene-like atomic planes having an inter-planar spacing less than 0.336 nm, a mosaic spread value no greater than 0.4, a thermal conductivity greater than 400 W/mK per unit of specific gravity, and/or an electrical conductivity greater than 3,000 S/cm per unit of specific gravity.

In a preferred embodiment, the pore walls contain stacked graphene-like hexagonal carbon atomic planes having an inter-planar spacing less than 0.337 nm and a mosaic spread value less than 1.0. In a preferred embodiment, the foam exhibits a degree of graphitization no less than 80% (preferably no less than 90%) and/or a mosaic spread value less than 0.4. In a preferred embodiment, the pore walls contain a 3D network of interconnected graphene-like hexagonal carbon atomic planes.

In a preferred embodiment, the HA-derived foam contains meso-scaled pores having a pore size from 2 nm to 50 nm. The solid foam can also be made to contain micron-scaled pores (1-500 μm).

Preferably, the presently invented HA-derived foam may be produced by a process comprising: (a) preparing a humic acid dispersion having multiple humic acid molecules or sheets dispersed in a liquid medium, wherein the humic acid is selected from oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, or a combination thereof and wherein the dispersion contains an optional blowing agent having a blowing agent-to-humic acid weight ratio from 0/1.0 to 1.0/1.0; (b) dispensing and depositing the graphene dispersion onto a surface of a supporting substrate (e.g. plastic film, rubber sheet, metal foil, glass sheet, paper sheet, etc.) to form a wet layer of humic acid; (c) partially or completely removing the liquid medium from the wet layer of humic acid to form a dried layer of humic acid; and (d) heat treating the dried layer of humic acid at a first heat treatment temperature from 80° C. to 3,200° C. at a desired heating rate sufficient to induce formation and releasing of volatile gas molecules from the non-carbon elements (e.g. O, H, N, B, F, Cl, Br, I, etc.) or to activate the blowing agent for producing humic acid-derived foam. Preferably, the dispensing and depositing procedure includes subjecting the humic acid dispersion to an orientation-inducing stress.

This optional blowing agent is not required if the HA material has a content of non-carbon elements (e.g. O, H, N, B, F, Cl, Br, I, etc.) no less than 5% by weight (preferably no less than 10%, further preferably no less than 20%, even more preferably no less than 30%). The subsequent high temperature treatment serves to remove a majority of these non-carbon elements from the edges of HA molecules, generating volatile gas species that produce pores or cells in the solid foam structure. In other words, quite surprisingly, these non-carbon elements play the role of a blowing agent. Hence, an externally added blowing agent is optional (not required). However, the use of a blowing agent can provide added flexibility in regulating or adjusting the porosity level and pore sizes for a desired application. The blowing agent is typically required if the non-carbon element content in the humic acid is less than 5%.

The blowing agent can be a physical blowing agent, a chemical blowing agent, a mixture thereof, a dissolution-and-leaching agent, or a mechanically introduced blowing agent.

The process may further include a step of heat-treating the solid foam at a second heat treatment temperature higher than the first heat treatment temperature for a length of time sufficient for obtaining a graphene-like foam wherein the pore walls contain stacked hexagonal carbon atomic planes having an inter-planar spacing $d_{002}$ from 0.3354 nm to 0.40 nm and a content of non-carbon elements less than 5% by weight (typically from 0.001% to 2%). When the resulting non-carbon element content is from 0.1% to 2.0%, the inter-plane spacing $d_{002}$ is typically from 0.337 nm to 0.40 nm.

If the original HA molecules in the dispersion contains a non-carbon element content higher than 5% by weight, the hexagonal carbon atomic planes in the solid foam (after the heat treatment) contain structural defects that are induced during the step (d) of heat treating. The liquid medium can be simply water and/or an alcohol, which is environmentally benign.

In a preferred embodiment, the process is a roll-to-roll process wherein steps (b) and (c) include feeding the supporting substrate from a feeder roller to a deposition zone, continuously or intermittently depositing the HA dispersion onto a surface of the supporting substrate to form the wet layer of HA material thereon, drying the wet layer of HA material to form the dried layer of HA material, and collecting the dried layer of HA material deposited on the supporting substrate on a collector roller. Such a roll-to-roll or reel-to-reel process is a truly industrial-scale, massive manufacturing process that can be automated.

In one embodiment, the first heat treatment temperature is from 100° C. to 1,500° C. In another embodiment, the second heat treatment temperature includes at least a temperature selected from (A) 300-1,500° C., (B) 1,500-2,100° C., and/or (C) 2,100-3,200° C. In a specific embodiment, the second heat treatment temperature includes a temperature in the range of 300-1,500° C. for at least 1 hour and then a temperature in the range of 1,500-3,200° C. for at least 1 hour.

There are several surprising results of conducting first and/or second heat treatments to the dried HA layer, and different heat treatment temperature ranges enable us to achieve different purposes, such as (a) removal of non-carbon elements from the HA material (e.g. thermal reduction of fluorinated humic acid to obtain reduced humic acid) which generate volatile gases to produce pores or cells in the HA foam, (b) activation of the chemical or physical blowing agent to produce pores or cells, (c) chemical linking or merging of humic acid molecules into highly aromatic molecules and edge-to-edge merging of aromatic ring structures or hexagonal carbon planes to significantly increase the lateral dimensions (length and width) of graphene-like hexagonal carbon sheets in the foam walls (solid portion of the foam), (d) healing of defects naturally existing in HA or created during fluorination, oxidation, or nitrogenation of humic acid molecules, and (e) re-organization and perfection of graphitic domains or graphite crystals. These different purposes or functions are achieved to different extents within different temperature ranges. The non-carbon elements typically include an element selected from oxygen, fluorine, chlorine, bromine, iodine, nitrogen, hydrogen, or boron. Quite surprisingly, even under low-temperature foaming conditions, heat-treating induces chemical linking, merging, or chemical bonding between sheet-like HA molecules, often in an edge-to-edge manner (some in face-to-face manner).

In one embodiment, the HA-derived foam has a specific surface area (when measured without the presence of sulfur or sulfide) from 200 to 2,000 m²/g. In one embodiment, the solid foam has a density from 0.1 to 1.5 g/cm³. In an embodiment, step (d) of heat treating the layer of HA material at a first heat treatment temperature is conducted under a compressive stress. In another embodiment, the process comprises a compression step to reduce a thickness, pore size, or porosity level of the film of HA-derived foam. In some applications, the foam has a thickness no greater than 200 μm.

In an embodiment, the HA dispersion has at least 5% by weight of HA dispersed in the liquid medium to form a liquid crystal phase. In an embodiment, the first heat treatment temperature contains a temperature in the range of 80° C.-300° C. and, as a result, the HA foam has an oxygen content or non-carbon element content less than 5%, and the pore walls have an inter-planar spacing less than 0.40 nm, a thermal conductivity of at least 150 W/mK (more typically at least 200 W/mk) per unit of specific gravity, and/or an electrical conductivity no less than 1,000 S/cm per unit of specific gravity. Unless otherwise specified, all these properties are measured when no sulfur or sulfide is present in the pores.

In a preferred embodiment, the first and/or second heat treatment temperature contains a temperature in the range of 300° C.-1,500° C. and, as a result, the HA-derived foam has an oxygen content or non-carbon content less than 2%, and the pore walls have an inter-planar spacing less than 0.35 nm, a thermal conductivity of at least 250 W/mK per unit of specific gravity, and/or an electrical conductivity no less than 1,500 S/cm per unit of specific gravity.

When the first and/or second heat treatment temperature contains a temperature in the range of 1,500° C.-2,100° C., the HA-derived foam has an oxygen content or non-carbon content less than 1% and pore walls have an inter-graphene spacing less than 0.34 nm, a thermal conductivity of at least 300 W/mK per unit of specific gravity, and/or an electrical conductivity no less than 3,000 S/cm per unit of specific gravity.

When the first and/or second heat treatment temperature contains a temperature greater than 2,100° C., the HA-derived foam has an oxygen content or non-carbon content no greater than 0.1% and pore walls have an inter-planar spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

If the first and/or second heat treatment temperature contains a temperature no less than 2,500° C., the HA-derived foam has pore walls containing stacked graphene-like hexagonal carbon planes having an inter-planar spacing less than 0.336 nm, a mosaic spread value no greater than 0.4, and a thermal conductivity greater than 400 W/mK per unit of specific gravity, and/or an electrical conductivity greater than 4,000 S/cm per unit of specific gravity.

In one embodiment, the pore walls contain stacked graphene-like hexagonal carbon planes having an inter-planar spacing less than 0.337 nm and a mosaic spread value less than 1.0. In another embodiment, the solid wall portion of the HA-derived foam exhibits a degree of graphitization no less than 80% and/or a mosaic spread value less than 0.4. In yet another embodiment, the solid wall portion of the HA-derived foam exhibits a degree of graphitization no less than 90% and/or a mosaic spread value no greater than 0.4.

Typically, after a heat treatment at a HTT higher than 2,500° C., the pore walls in the HA-derived graphitic foam contain a 3D network of interconnected hexagonal carbon atomic planes that are electron-conducting pathways. The cell walls contain graphitic domains or graphite crystals having a lateral dimension ($L_a$, length or width) no less than 20 nm, more typically and preferably no less than 40 nm, still more typically and preferably no less than 100 nm, still more typically and preferably no less than 500 nm, often greater than 1 μm, and sometimes greater than 10 μm. The graphitic domains typically have a thickness from 1 nm to 20 nm, more typically from 1 nm to 10 nm, and further more typically from 1 nm to 4 nm.

Preferably, the HA-derived foam contains meso-scaled pores having a pore size from 2 nm to 50 nm (preferably 2 nm to 25 nm).

In a preferred embodiment, the present invention provides a roll-to-roll process for producing a solid HA foam or HA-derived foam composed of multiple pores and pore walls The process comprises: (a) preparing a humic acid dispersion having multiple humic acid molecules or sheets dispersed in a liquid medium, wherein the humic acid is selected from oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, or a combination thereof and wherein the dispersion contains an optional blowing agent having a blowing agent-to-humic acid weight ratio from 0/1.0 to 1.0/1.0; (b) continuously or intermittently dispensing and depositing the HA dispersion onto a surface of a supporting substrate to form a wet layer of HA material, wherein the supporting substrate is a continuous thin film supplied from a feeder roller and collected on a collector roller; (c) partially or completely removing the liquid medium from the wet layer of humic acid to form a dried layer of humic acid in a heating zone or multiple heating zones; and (d) heat treating the dried layer of humic acid in one of these heating zones containing a heating temperature from 80° C. to 500° C. at a desired heating rate sufficient to activate the blowing agent for producing the humic acid-derived foam having a density from 0.01 to 1.7 g/cm$^3$ or a specific surface area from 50 to 3,000 m$^2$/g. In this process, heat treatments occur in situ during the roll-to-roll procedure. This is a highly cost-effective process amenable to mass production of HA-derived graphitic foam sheets that are wrapped around on a roller for ease of shipping and handling and, subsequently, ease of cutting and slitting.

The orientation-inducing stress may be a shear stress. As an example, the shear stress can be encountered in a situation as simple as a "doctor's blade" that guides the spreading of HA dispersion over a plastic or glass surface with a sufficiently high shear rate during a manual casting process. As another example, an effective orientation-inducing stress is created in an automated roll-to-roll coating process in which a "knife-on-roll" configuration dispenses the graphene dispersion over a moving solid substrate, such as a plastic film at a sufficiently high speed. The relative motion between this moving film and the coating knife can act to effect orientation of graphene sheets along the shear stress direction. Comma coating and slot-die coating are particularly effective methods for this function.

This orientation-inducing stress is a critically important step in the production of the presently invented HA-derived foams due to the surprising observation that the shear stress enables the HA molecules or sheets to align along a particular direction (e.g. X-direction or length-direction) to produce preferred orientations and facilitate contacts between HA molecules or sheets along foam walls. Further surprisingly, these preferred orientations and improved HA-to-HA contacts facilitate chemical merging or linking between HA molecules or sheets during the subsequent heat treatment of the dried HA layer. Such preferred orientations and improved contacts are essential to the eventual attainment of exceptionally high thermal conductivity, electrical conductivity, elastic modulus, and mechanical strength of the resulting HA-derived foam. In general, these great properties could not be obtained without such a shear stress-induced orientation control.

The HA-derived foam is then impregnated with sulfur or sulfide using any well-known impregnation procedure, such as sulfur vapor impregnation, solution deposition, electrochemical deposition, chemical deposition of sulfur or sulfide.

The present invention also provides a metal-sulfur battery containing the aforementioned sulfur cathode as an active cathode layer, an anode, and a metal ion-conducting electrolyte in ionic contact with the cathode and the anode. The metal-sulfur battery may be a lithium-sulfur battery, sodium-sulfur battery, potassium-sulfur battery, magnesium-sulfur battery, or aluminum-sulfur battery. In certain embodiments, the anode of the metal-sulfur battery contains a metal, metal alloy, or metal compound of Li, Na, K, Mg, or Al metal as an anode active material.

It may be noted that the humic acid-derived foam itself also plays the role of a cathode current collector due to its high electrical conductivity. This foam layer can be directly connected to an external circuit load via a terminal tab, obviating the need to have a separate layer of cathode current collector (e.g. typically an Al foil). This feature significantly reduces the weight and volume of a battery, thereby further increasing the energy density of the battery. This is an unexpected, added advantage of the presently invented sulfur cathode.

However, optionally, one could still use a separate (additional) current collector. Also optionally, one can use an anode current collector (e.g. Cu foil, Ti foil, or stainless steel foil) in electronic contact with the anode of the metal-sulfur cell. Thus, another embodiment of the instant invention is a metal-sulfur battery that further comprises an anode current collector in electronic contact with the anode and/or a cathode current collector in electronic contact with the sulfur cathode.

In certain embodiments, the electrolyte in the metal-sulfur battery is selected from polymer electrolyte, polymer gel electrolyte, composite electrolyte, ionic liquid electrolyte, non-aqueous liquid electrolyte, soft matter phase electrolyte, solid-state electrolyte, or a combination thereof.

In certain embodiments, the battery electrolyte contains a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), Lithium bis(oxalato)borate (LiBOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), $Mg(AlCl_2EtBu)_2$, $MgCl_2/AlCl_3$, $Mg(ClO_4)_2$, $Mg(OH)_2$, $Al(OH)_3$, or a combination thereof.

In certain embodiments, the battery electrolyte contains a solvent selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, 1-ethyl-methyl-imidazolium chloride (EMIC), tetrahydrofuran (THF), room temperature ionic liquid, or a combination thereof.

In certain embodiments, the anode of the metal-sulfur battery contains an anode active material selected from lithium metal, sodium metal, potassium metal, magnesium metal, aluminum metal, a lithium metal alloy, a sodium metal alloy, a potassium metal alloy, a magnesium metal alloy, an aluminum alloy, a lithium intercalation compound, a sodium intercalation compound, a potassium intercalation compound, a lithium-containing compound, a sodium-containing compound, a potassium-doped compound, a magnesium-doped compound, a magnesium-intercalated compound, an aluminum-doped compound, an aluminum-containing compound, or a combination thereof.

In certain preferred embodiments, the metal-sulfur battery is a lithium ion-sulfur cell and the anode contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof.

In certain preferred embodiments, the metal-sulfur battery is a sodium ion-sulfur cell or potassium ion-sulfur cell and the anode contains an anode active material selected from the group consisting of: (a0 Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof: (d) Sodium or potassium salts; (e) particles of graphite, hard carbon, soft carbon or carbon particles and pre-sodiated versions thereof; and combinations thereof.

DESCRIPTION OF THE PREFERRED EMBODIMENTS

Figure 1:
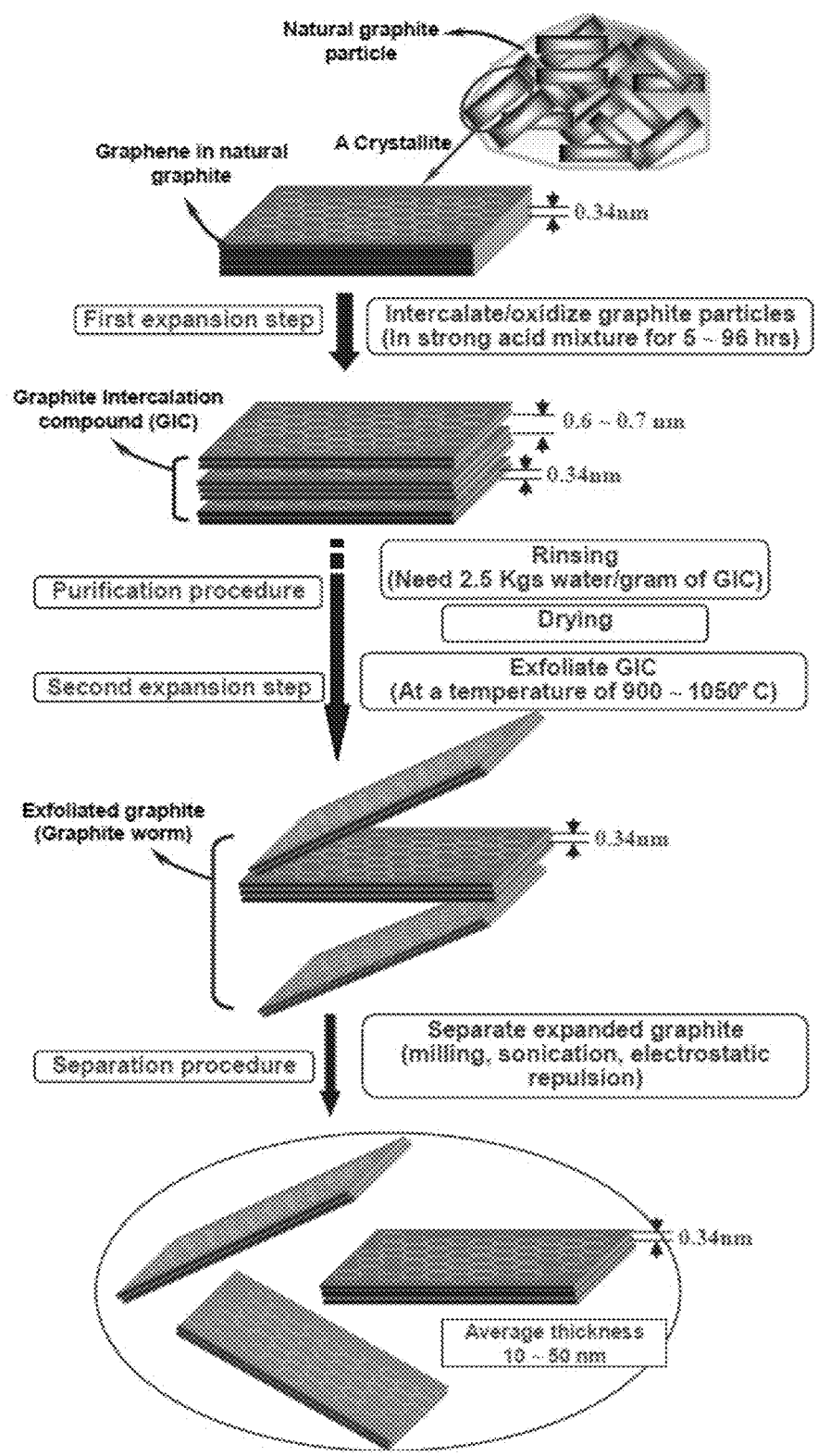
FIG. 1 Schematic drawing illustrating the processes for producing graphene sheets from natural graphite particles.

The present invention provides a sulfur cathode for a metal-sulfur battery, which can be a primary battery or secondary battery (rechargeable battery). The sulfur cathode contains a humic acid-derived foam, composed of multiple pores and pore walls, and sulfur or sulfide impregnated into the pores or deposited on the pore walls.

Humic acid (HA) is an organic matter commonly found in soil and can be extracted from the soil using a base (e.g. KOH). HA can also be extracted from a type of coal called leonardite, which is a highly oxidized version of lignite coal. HA extracted from leonardite contains a number of oxygenated groups (e.g. carboxyl groups) located around the edges of the graphene-like molecular center ($SP^2$ core of hexagonal carbon structure). This material is slightly similar to graphene oxide (GO) which is produced by strong acid oxidation of natural graphite. HA has a typical oxygen content of 5% to 42% by weight (other major elements being carbon, hydrogen, and nitrogen). An example of the molecular structure for humic acid, having a variety of components including quinone, phenol, catechol and sugar moieties, is given in Scheme 1 below (source: Stevenson F. J. "*Humus Chemistry: Genesis, Composition, Reactions*," John Wiley & Sons, New York 1994).

(Scheme 1)

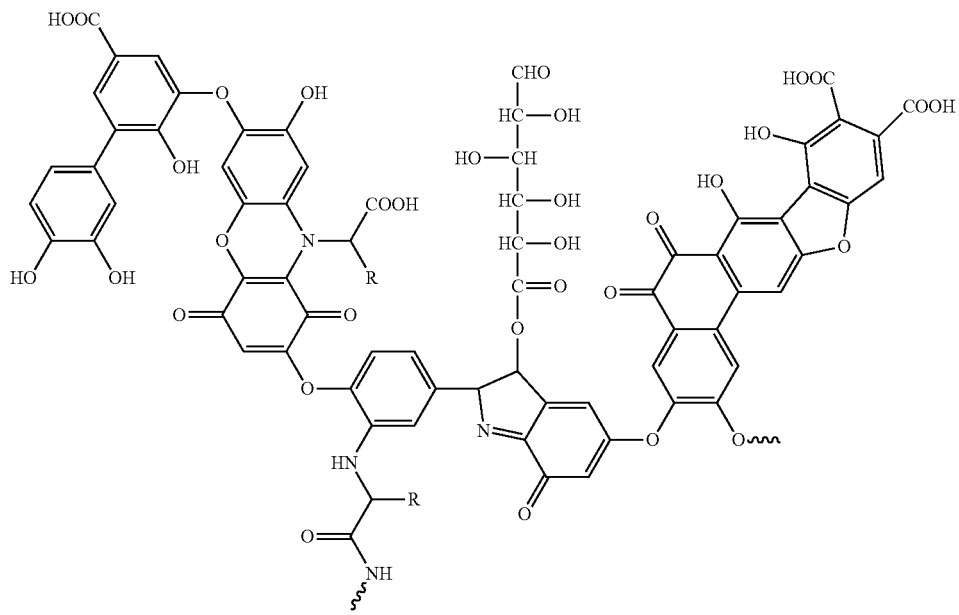

It is generally believed that the basic molecular structure of humic acid derived from coal products (e.g. leonardite) has fused benzene rings as schematically shown in Scheme 2 below (as an example for illustration purposes), wherein the number of fused rings can be varied from approximately 5 to several thousands, but more typically from 10 to several hundreds. There are typically functional groups, such as —COOH, —OH, and >O, attached to edges of the fused-ring or aromatic structure.

(Scheme 2)

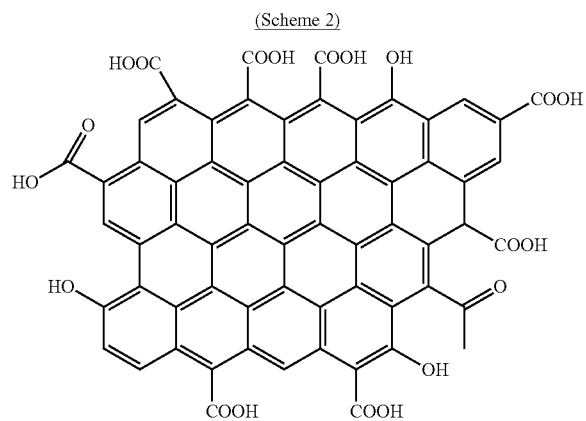 [SMILES: CC(=O)c1c2c3c4c5c(cc(C(=O)O)cc5c(O)c5c(C(=O)O)c6c(C(=O)O)c7c(C(=O)O)cc8c(C(=O)O)cc9c%10c(O)ccc%11c(C(=O)O)c%12cc%13c(C(=O)O)c(O)c1c1c%13c%13c%12c(c%11%10)c%10c9c8c7c7c6c(c54)c(c31)c%13c7%10)C2C(=O)O]

The present application is directed at all humic acid species that can be represented by either Scheme 1 or Scheme 2. Some of lower molecular weight humic acid molecules having —COOH or —OH groups can be dissolved in water and alcohol. Non-aqueous solvents for humic acid include polyethylene glycol, ethylene glycol, propylene glycol, an alcohol, a sugar alcohol, a polyglycerol, a glycol ether, an amine based solvent, an amide based solvent, an alkylene carbonate, an organic acid, or an inorganic acid.

The present invention provides a humic acid-derived foam composed of multiple pores and pore walls and a process for producing same. These pores are impregnated with sulfur or polysulfide, preferably in a thin coating or fine nano particle form. The pores in the foam are formed during or after sheet-like humic acid molecules are (1) chemically linked/merged together (edge-to-edge and/or face-to-face) typically at a temperature from 100 to 1,500° C. and/or (2) organized into larger graphite crystals or domains (herein referred to as graphitization) along the pore walls at a high temperature (typically >2,100° C. and more typically >2,500° C.).

The invention also provides a production process for the impregnated foam. The process comprises: (a) preparing a humic acid dispersion having multiple humic acid molecules or sheets dispersed in a liquid medium (and, optionally, graphene sheets), wherein the humic acid is selected from oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, or a combination thereof and wherein the dispersion contains an optional blowing agent having a blowing agent-to-humic acid weight ratio from 0/1.0 to 1.0/1.0; (b) dispensing and depositing the graphene dispersion onto a surface of a supporting substrate (e.g. plastic film, rubber sheet, metal foil, glass sheet, paper sheet, etc.) to form a wet layer of humic acid; (c) partially or completely removing the liquid medium from the wet layer of humic acid to form a dried layer of humic acid; (d) heat treating the dried layer of humic acid at a first heat treatment temperature from 80° C. to 3,200° C. at a desired heating rate sufficient to induce volatile gas molecules from the non-carbon elements (e.g. O, H, N, B, F, Cl, Br, I, etc.) or to activate the blowing agent for producing humic acid-derived foam; and (e) impregnating the pores with sulfur or polysulfide. Preferably, the dispensing and depositing procedure includes subjecting the humic acid dispersion to an orientation-inducing stress. These non-carbon elements, when being removed via heat-induced decomposition, produces volatile gases that act as a foaming agent or blowing agent.

The resulting humic acid-derived foam or HA/graphene-derived foam, when measured without the presence of sulfur or sulfide, typically has a density from 0.005 to 1.7 g/cm$^3$ (more typically from 0.01 to 1.5 g/cm$^3$, and even more typically from 0.1 to 1.0 g/cm$^3$, and most typically from 0.2 to 0.75 g/cm$^3$), or a specific surface area from 50 to 3,000 m$^2$/g (more typically from 200 to 2,000 m$^2$/g, and most typically from 500 to 1,500 m$^2$/g).

A blowing agent or foaming agent is a substance which is capable of producing a cellular or foamed structure via a foaming process in a variety of materials that undergo hardening or phase transition, such as polymers (plastics and rubbers), glass, and metals. They are typically applied when the material being foamed is in a liquid state. It has not been previously known that a blowing agent can be used to create a foamed material while in a solid state. More significantly, it has not been previously taught or hinted that an aggregate of humic acid molecules can be converted into a graphene-like foam via a blowing agent. The cellular structure in a matrix is typically created for the purpose of reducing density, increasing thermal resistance and acoustic insulation, while increasing the thickness and relative stiffness of the original polymer.

Blowing agents or related foaming mechanisms to create pores or cells (bubbles) in a matrix for producing a foamed or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

(e) Soluble and leachable agents: Soluble fillers, e.g. solid sodium chloride crystals mixed into a liquid urethane system, which is then shaped into a solid polymer part, the sodium chloride is later washed out by immersing the solid molded part in water for some time, to leave small inter-connected holes in relatively high density polymer products.

(f) We have found that the above five mechanisms can all be used to create pores in the HA-derived materials while they are in a solid state. Another mechanism of producing pores in a HA material is through the generation and vaporization of volatile gases by removing those non-carbon elements in a high-temperature environment. This is a unique self-foaming process that has never been previously taught or suggested.

The pore walls (cell walls) in the presently invented foam contain chemically bonded and merged graphene-like hexagonal carbon atomic planes. These planar aromatic molecules or hexagonal structured carbon atoms are well interconnected physically and chemically. The lateral dimensions (length or width) of these planes are huge (from 20 nm to >10 μm), typically several times or even orders of magnitude larger than the maximum length/width of the starting humic acid molecules. The hexagonal carbon atomic planes are essentially interconnected to form long electron-conducting pathways with low resistance. This is a unique and new class of material that has not been previously discovered, developed, or suggested to possibly exist.

In step (b), a HA suspension (or HA/graphene suspension) is formed into a wet layer on a solid substrate surface (e.g. PET film or glass) preferably under the influence of a shear stress. One example of such a shearing procedure is casting or coating a thin film of HA suspension (or HA/graphene suspension) using a coating machine. This procedure is similar to a layer of varnish, paint, coating, or ink being coated onto a solid substrate. The roller, "doctor's blade", or wiper can create a shear stress when the film is shaped at a high rate, or when there is a relative motion between the roller/blade/wiper and the supporting substrate at a high relative motion speed sufficient for achieving a high shearing rate. (It may be noted that the mere use of a roller/blade/wiper normally is not sufficient to enable a sufficient level of shearing stress for HA molecular alignment.) Quite unexpectedly and significantly, such a shearing action enables the planar HA molecules to well align along, for instance, the shearing direction. Further surprisingly, such a molecular alignment state or preferred orientation is not disrupted when the liquid components in the HA suspension are subsequently removed to form a well-packed layer of highly aligned sheet-like HA molecules that are at least partially dried. The dried HA film has a high birefringence coefficient between an in-plane direction and the normal-to-plane direction.

In an embodiment, this HA or HA/graphene layer is then subjected to a heat treatment to activate the blowing agent and/or the thermally-induced reactions that remove the non-carbon elements (e.g. F, O, etc.) from the HA molecules to generate volatile gases as by-products. These volatile gases generate pores or bubbles inside the solid HA material, pushing sheet-like HA molecules into a wall structure, forming a HA foam. If no blowing agent is added, the non-carbon elements in the HA material preferably occupy at least 10% by weight of the HA material (preferably at least 20%, and further preferably at least 30%). The first (initial) heat treatment temperature is typically greater than 80° C., preferably greater than 100° C., more preferably greater than 300° C., further more preferably greater than 500° C. and can be as high as 1,500° C. The blowing agent is typically activated at a temperature from 80° C. to 300° C., but can be higher. The foaming procedure (formation of pores, cells, or bubbles) is typically completed within the temperature range of 80-1,500° C. Quite surprisingly, the chemical linking or merging between hexagonal carbon atomic planes in an edge-to-edge and face-to-face manner (FIG. 2) can occur at a relatively low heat treatment temperature (e.g. as low as from 150 to 300° C.).

The HA- or HA/graphene-derived foam may be subjected to a further heat treatment that involves at least a second temperature that is significantly higher than the first heat treatment temperature.

A properly programmed heat treatment procedure can involve just a single heat treatment temperature (e.g. a first heat treatment temperature only), at least two heat treatment temperatures (first temperature for a period of time and then raised to a second temperature and maintained at this second temperature for another period of time), or any other combination of heat treatment temperatures (HTT) that involve an initial treatment temperature (first temperature) and a final HTT (second), higher than the first. The highest or final HTT that the dried HA layer experiences may be divided into four distinct HTT regimes:

Regime 1 (80° C. to 300° C.): In this temperature range (the initial chemical linking regime and also the activation regime for a blowing agent, if present), HA layer primarily undergoes thermally-induced chemical linking of neighboring HA molecules, as schematically illustrated in the upper portion of FIG. 2. This also involves removal of some non-carbon atoms, such as O and H, leading to a reduction of oxygen content from typically 20-42% (of O in HA) to approximately 10-25%. This treatment results in a reduction of inter-planar spacing in foam walls from approximately 0.6-1.2 nm (as dried) down to approximately 0.4-0.6 nm, and an increase in thermal conductivity to 100 W/mK per unit specific gravity and/or electrical conductivity to 2,000 S/cm per unit of specific gravity. (Since one can vary the level of porosity and, hence, specific gravity of a graphene foam material and, given the same graphene material, both the thermal conductivity and electric conductivity values vary with the specific gravity, these property values must be divided by the specific gravity to facilitate a fair comparison.) Even with such a low temperature range, some chemical linking between HA molecules occurs. The inter-planar spacing remains relatively large (0.4 nm or larger). Many O-containing functional groups survive (e.g. —OH and —COOH).

Regime 2 (300° C.-1,500° C.): In this chemical linking and merging regime, extensive chemical combination, polymerization, and cross-linking between adjacent HA molecules or linked HA molecules occur to form incipient graphene-like hexagonal carbon atomic planes, as illustrated in lower portion of FIG. 2. The oxygen content is reduced to typically from 2% to 10% (e.g. after chemical linking and merging), resulting in a reduction of inter-planar spacing to approximately 0.345 nm. This implies that some initial graphitization has already begun at such a low temperature, in stark contrast to conventional graphitizable materials (such as carbonized polyimide film) that typically require a temperature as high as 2,500° C. to initiate graphitization. This is another distinct feature of the presently invented graphene foam and its production processes. These chemical linking reactions result in an increase in thermal conductivity to >250 W/mK per unit of specific gravity, and/or electrical conductivity to 2,500-4,000 S/cm per unit of specific gravity.

Regime 3 (1,500-2,500° C.): In this ordering and graphitization regime, extensive graphitization or merging of graphene-like planes occurs, leading to significantly improved degree of structural ordering in the foam walls. As a result, the oxygen content is reduced to typically 0.1%-2% and the inter-graphene spacing to approximately 0.337 nm (achieving degree of graphitization from 1% to approximately 80%, depending upon the actual HTT and length of time). The improved degree of ordering is also reflected by an increase in thermal conductivity to >350 W/mK per unit of specific gravity, and/or electrical conductivity to >3,500 S/cm per unit of specific gravity.

Regime 4 (higher than 2,500° C.): In this re-crystallization and perfection regime, extensive movement and elimination of grain boundaries and other defects occur, resulting in the formation of nearly perfect single crystals or poly-crystalline graphene-like crystals with huge grains in the foam walls, which can be orders of magnitude larger than the original sizes of HA molecules. The oxygen content is essentially eliminated, typically 0%-0.01%. The inter-planar spacing is reduced to down to approximately 0.3354 nm (degree of graphitization from 80% to nearly 100%), corresponding to that of a perfect graphite single crystal. The foamed structure thus obtained exhibits a thermal conductivity of >400 W/mK per unit of specific gravity, and electrical conductivity of >4,000 S/cm per unit of specific gravity.

The presently invented HA- or HA/graphene-derived foam structure can be obtained by heat-treating the dried HA or HA/graphene layer with a temperature program that covers at least the first regime (typically requiring 1-4 hours in this temperature range if the temperature never exceeds 500° C.), more commonly covers the first two regimes (1-2 hours preferred), still more commonly the first three regimes (preferably 0.5-2.0 hours in Regime 3), and can cover all the 4 regimes (including Regime 4 for 0.2 to 1 hour, may be implemented to achieve the highest conductivity).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite- or graphene-type crystal in nm. This equation is valid only when $d_{002}$ is equal or less than approximately 0.3440 nm. The HA-derived foam walls having a $d_{002}$ higher than 0.3440 nm reflects the presence of oxygen-containing functional groups (such as —OH, >O, and —COOH on graphene-like molecular plane surfaces or edges) that act as a spacer to increase the inter-planar spacing.

Another structural index that can be used to characterize the degree of ordering of the stacked and bonded hexagonal carbon atomic planes in the foam walls of HA-derived graphene-like and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

Figure 2:
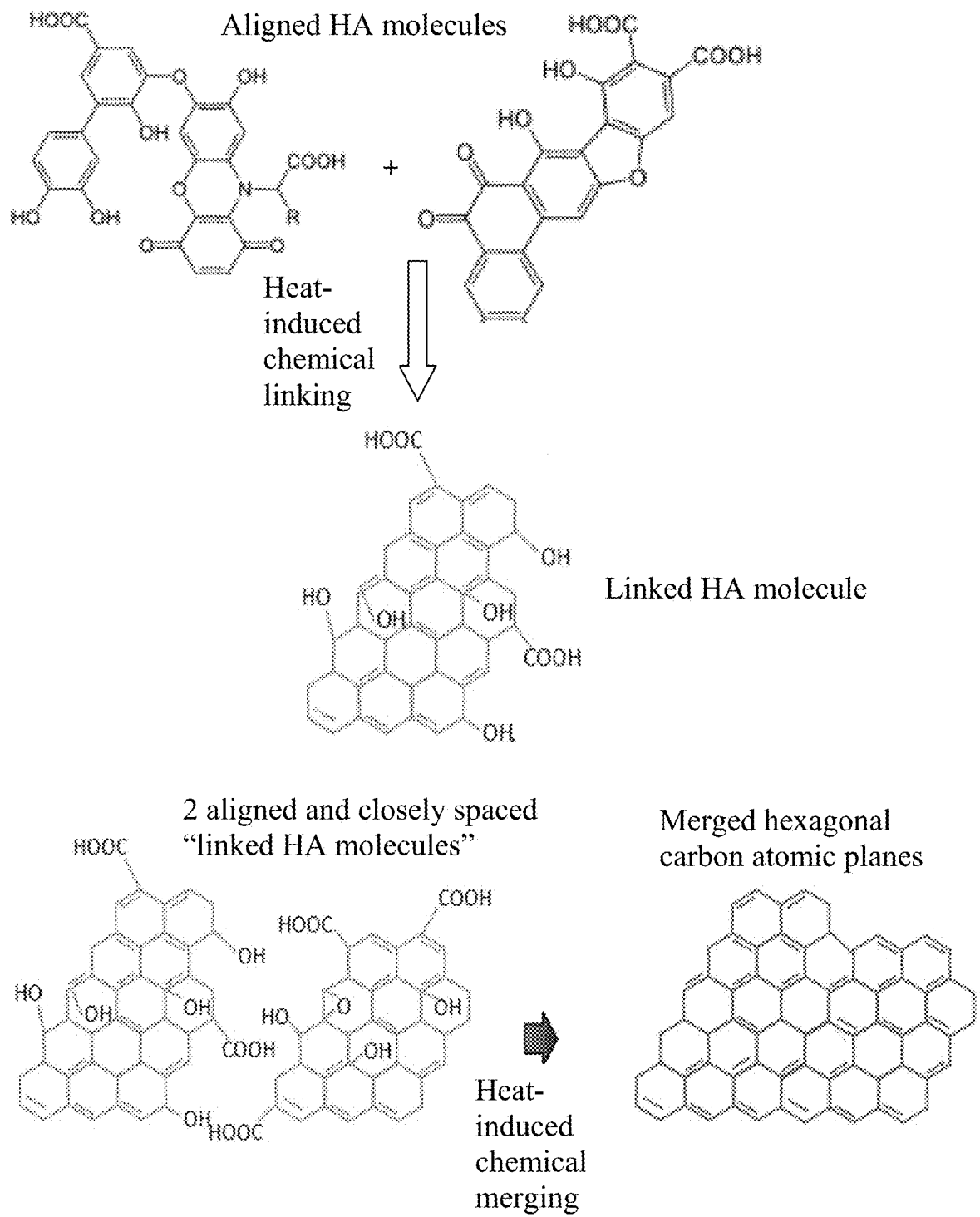
FIG. 2 A possible mechanism of chemical linking and merging between humic acid molecules and between "linked HA molecules." Two or three original HA molecules can get chemically linked together to form longer or wider HA molecules, called "linked HA molecules". Multiple "linked HA molecules" can be merged to form graphene-like hexagonal carbon atomic planes.

Illustrated in FIG. 2 is a plausible chemical linking and merging mechanism where only 2 aligned HA molecular segments are shown as an example, although a large number of HA molecules can be chemically linked together and multiple "linked HA molecules) can be chemically merged to form a foam wall. Further, chemical linking could also occur face-to-face, not just edge-to-edge for HA molecules or sheets. These linking and merging reactions proceed in such a manner that the molecules are chemically merged, linked, and integrated into one single entity. The resulting product is not a simple aggregate of individual HA sheets, but a single entity that is essentially a network of interconnected giant molecules with an essentially infinite molecular weight. All the constituent hexagonal carbon planes are very large in lateral dimensions (length and width) and, if the HTT is sufficiently high (e.g. >1,500° C. or much higher), these planes are essentially bonded together with one another.

In-depth studies using a combination of SEM, TEM, selected area diffraction, X-ray diffraction, AFM, Raman spectroscopy, and FTIR indicate that the HA-derived foam walls are composed of several huge hexagonal carbon atomic planes (with length/width typically >>20 nm, more typically >>100 nm, often >>1 µm, and, in many cases, >>10 µm, or even >>100 µm). These giant graphene-like planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^a$ (weak but existing) electronic configurations, not just the conventional $sp^2$ in graphite.

(1) This HA-derived graphitic foam wall is not made by gluing or bonding discrete flakes/platelets together with a resin binder, linker, or adhesive. Instead, HA molecules are merged through joining or forming of covalent bonds with one another, into an integrated graphene-like crystal entity, without using any externally added linker or binder molecules or polymers.

(2) The foam wall is typically a poly-crystal composed of large grains having incomplete grain boundaries. This entity is derived from multiple HA molecules and these aromatic HA molecules have lost their original identity. Upon removal of the liquid component from the suspension, the resulting HA molecules form an essentially amorphous structure. Upon heat treatments, these HA molecules are chemically merged and linked into a unitary or monolithic graphitic entity that constitutes the foam wall. This foam wall is highly ordered.

(3) Due to these unique chemical composition (including oxygen or non-carbon content), morphology, crystal structure (including inter-planar spacing), and structural features (e.g. high degree of orientations, few defects, incomplete grain boundaries, chemical bonding and no gap between graphene sheets, and substantially no interruptions in hexagonal carbon planes), the HA-derived foam has a unique combination of outstanding thermal conductivity, electrical conductivity, mechanical strength, and stiffness (elastic modulus).

It may be further noted that a certain desired degree of hydrophilicity can be imparted to the pore walls of the humic acid-derived foam if the non-carbon element content (H and O) is from 2 to 20% by weight. These features impart different type of bonding between sulfur (or sulfide) and hexagonal carbon atomic planes of the pore walls.

If a high electrical or thermal conductivity is desired, the HA-carbon foam can be subjected to graphitization treatment at a temperature higher than 2,500° C.

It may be noted that the HA-derived foam may be subjected to compression during and/or after the graphitization treatment. This operation enables us to adjust the orientation of hexagonal carbon atomic planes and the degree of porosity.

In order to characterize the structure of the graphitic materials produced, X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354\,g+0.344\,(1-g)$, where $d_{002}$ is the interlayer spacing of graphite or graphene crystal in nm. This equation is valid only when $d_{002}$ is equal or less than approximately 0.3440 nm. In the present study, the graphene-like (HA or RHA) foam walls having a $d_{002}$ higher than 0.3440 nm reflects the presence of oxygen-containing functional groups (such as —OH, >O, and —COOH on graphene molecular plane surfaces or edges) that act as a spacer to increase the inter-graphene spacing.

Another structural index that can be used to characterize the degree of ordering of the stacked and bonded RHA planes in the foam walls of graphene-like and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our RHA walls have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

In-depth studies using a combination of SEM, TEM, selected area diffraction, X-ray diffraction, AFM, Raman spectroscopy, and FTIR indicate that the humic acid-derived foam walls are composed of several large graphene-like hexagonal carbon atomic planes (with length/width typically $\gg$20 nm, more typically $\gg$100 nm, often $\gg$1 μm, and, in many cases, $\gg$10 μm). This is quite unexpected since the lateral dimensions (length and width) of original humic acid sheets or molecules, prior to being heat treated, are typically <20 nm and more typically <10 nm. This implies that a plurality of HA sheets or molecules can be merged edge to edge through covalent bonds with one another, into a larger (longer or wider) sheet.

These large graphene-like planes also can be stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^a$ (weak but existing) electronic configurations, not just the conventional $sp^2$ in graphite.

The integral HA-derived foam is composed of multiple pores and pore walls, wherein the pore walls contain single-layer or few-layer HA sheets chemically bonded together, wherein the few-layer HA sheets have 2-10 layers of stacked graphene-like merged HA planes having an inter-plane spacing $d_{002}$ from 0.3354 nm to 0.36 nm as measured by X-ray diffraction and the single-layer or few-layer graphene-like HA sheets contain 0.01% to 25% by weight of non-carbon elements (more typically <15%).

The integral HA-derived foam typically has a density from 0.001 to 1.7 g/cm$^3$, a specific surface area from 50 to 3,000 m$^2$/g, a thermal conductivity of at least 200 W/mK per unit of specific gravity, and/or an electrical conductivity no less than 2,000 S/cm per unit of specific gravity. In a preferred embodiment, the pore walls contain stacked graphene-like RHA planes having an inter-planar spacing $d_{002}$ from 0.3354 nm to 0.40 nm as measured by X-ray diffraction. All these properties were measured without the presence of sulfur or sulfide.

Many of the HA sheets can be merged edge to edge through covalent bonds with one another, into an integrated reduced HA (RHA) entity. Due to these unique chemical composition (including oxygen or hydrogen content, etc.), morphology, crystal structure (including inter-planar spacing), and structural features (e.g. degree of orientations, few defects, chemical bonding and no gap between graphene-like sheets, and substantially no interruptions along hexagonal plane directions), the HA-derived foam has a unique combination of outstanding thermal conductivity, electrical conductivity, mechanical strength, and stiffness (elastic modulus).

Once a layer of HA-derived foam (preferably having pores of 1-100 nm in size, more preferably 2-50 nm, and most preferably 2-20 nm) is prepared, this layer can be impregnated with a desired amount of sulfur or sulfide, particularly metal polysulfide, $M_xS_y$, using several techniques:

The dip-coating technique is simple and effective and can be fully automated. In an embodiment, a proper amount of sulfur or $M_xS_y$ is dissolved in a suitable solvent up to 0.1-10% by weight (typically <5%) to form a solution. A continuous sheet of HA-derived foam can be fed from a feeder roller and immersed into a bath containing such solution and emerged from this path, allowing the solvent to be removed before the impregnated porous sheet of foam is wound on a winding roller. With a proper pore size range (preferably 2-50 nm) and surface chemical state of the hexagonal carbon atomic planes, species of sulfur or $M_xS_y$ readily migrate into the pores and deposit, as a coating or nano particles, onto pore internal wall surfaces, or simply precipitates out as nano sulfur or $M_xS_y$ particles residing in the pores of the porous structure. This is a roll-to-roll or reel-to-reel process and is highly scalable. In other words, the active cathode layer can be mass produced cost-effectively.

The liquid dispensing and coating technique is also simple and effective, and can be automated as well. Again, a layer of porous structure can be fed from a feeder roller and collected on a winding roller. Between these two ends, a solution or suspension (containing sulfur or $M_xS_y$ dissolved/dispersed in a liquid solvent) is dispensed and deposited on one or both surfaces of a porous structure, allowing solution or suspension to permeate into pores of the foam structure. Heating and/or drying provisions are also installed to help remove the solvent, allowing the sulfur or $M_xS_y$ species to permeate into the porous structure and precipitate out as a nano coating or nano particles. A broad array of dispensing/depositing techniques can be used; e.g. spraying (aerosol spraying, ultrasonic spraying, compressed air-driven spraying, etc.), printing (inkjet printing, screen printing, etc.), and coating (slot-die coating, roller coating, etc.). Alternatively, sulfur may be sublimed or vaporized in a chamber and the foam structure is allowed to pass through this chamber, enabling permeation of sulfur into pores. This roll-to-roll process is highly scalable.

The processing conditions can be readily adjusted to deposit sulfur or $M_xS_y$ particles or coating that have a thickness or diameter smaller than 20 nm (preferably <10 nm, more preferably <5 nm, and further preferably <3 nm). The resulting nano-scaled metal polysulfide particles or coating occupy a weight fraction of from 1% to 99%, but preferably at least 50% (preferably >70%, further preferably 80%, more preferably >90%, and most preferably >95%) based on the total weights of the sulfur particles or coating and the graphene material combined.

A range of polysulfide, $M_xS_y$, can be selected, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xS_y$ is selected from $Li_2S_6$, $Li_2S_7$, $Li_2S_8$, $Li_2S_9$, $Li_2S_{10}$, $Na_2S_4$, $Na_2S_5$, $Na_2S_6$, $Na_2S_7$, $Na_2S_8$, $Na_2S_9$, $Na_2S_{10}$, $K_2S_4$, $K_2S_5$, $K_2S_6$, $K_2S_7$, $K_2S_8$, $K_2S_9$, or $K_2S_{10}$.

Depending upon the intended type of $M_xS_y$ used, the solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. The $M_xS_y$ deposition is conducted before the cathode active layer is incorporated into an intended alkali metal-sulfur battery cell (e.g. a Li—S).

The solution or suspension may optionally contain some metal ion salts (e.g. Li salt if the cathode layer is intended for use in a Li—S cell, Na salt if Na—S cell, etc.). After battery cell fabrication, this salt can become part of the electrolyte system of the intended battery cell. This alkali metal salt may be selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis (oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), and bis-trifluoromethyl sulfonylimide potassium (KN(CF$_3$SO$_2$)$_2$), or a combination thereof.

After an extensive and in-depth research effort, we have come to realize that such a $M_xS_y$ pre-loading strategy surprisingly solves several most critical issues associated with current Li—S, Na—S, and K—S cells. For instance, this method enables the metal sulfide to be deposited in a thin coating or ultra-fine particle form, thus, providing ultra-short diffusion paths for Li/Na/K ions and, hence, ultra-fast reaction times for fast battery charges and discharges. This is achieved while maintaining a relatively high proportion of metal sulfide, which is later converted into sulfur in the battery cell. Since sulfur is the active material responsible for storing Li, Na, or K, this high loading of $M_xS_y$ implies a high specific Li/Na/K storage capacity of the resulting cathode active layer in terms of mAh/g, based on the total weight of the cathode layer, including the masses of the active material, supporting conductive material such as HA-derived graphene-like walls, optional binder resin, and optional conductive filler).

It is of significance to note that one might be able to use a prior art procedure to deposit small particles of S or select lithium polysulfide, but not a high S or lithium polysulfide proportion, or to achieve a high proportion but only in large particles or thick film form. But, the prior art procedures have not been able to achieve both high S or lithium polysulfide proportion and ultra-thin coating/particles at the same time. It is highly advantageous to obtain a high lithium polysulfide loading and yet, concurrently, maintaining an ultra-thin/small thickness/diameter of lithium polysulfide for significantly enhanced energy density and power density. This has not been possible with any prior art sulfur loading techniques. For instance, we have been able to deposit nano-scaled metal polysulfide particles or coating that occupy a >90% weight fraction of the cathode layer and yet maintaining a coating thickness or particle diameter <3 nm. This is quite a feat in the art of metal-sulfur batteries. As another example, we have achieved a >95% S loading at an average polysulfide coating thickness of 4.0-6 nm.

Electrochemists or materials scientists in the art of Li—S and Na—S batteries would expect that a greater amount of highly conducting carbon or graphite materials (hence, a smaller amount of S or polysulfide) in the cathode active layer should lead to a better utilization of S, particularly under high charge/discharge rate conditions. Contrary to these expectations, we have observed that the key to achieving a high S utilization efficiency is minimizing the S or metal polysulfide coating or particle size and this is independent of the amount of S or polysulfide loaded into the cathode provided the coating or particle thickness/diameter is small enough (e.g. <10 nm, or even better if <5 nm). The problem here is that it has not been previously possible to maintain a thin S or metal polysulfide coating or small particle size if S or polysulfide is higher than 50% by weight. Here we have further surprisingly observed that the key to enabling a high specific capacity at the cathode under high charge/discharge rate conditions is to maintain a high S or polysulfide loading and still keep the coating or particle size as small as possible, and this is accomplished by using the presently invented polysulfide pre-loading method.

The electrons coming from or going out through the external load or circuit must go through the conductive additives (in a conventional sulfur cathode) or a conductive framework (e.g. conductive meso-porous structure as herein disclosed) to reach the cathode active material. Since the cathode active material (e.g. sulfur or metal polysulfide) is a poor electronic conductor, the active material particle or coating must be as thin as possible to reduce the required electron travel distance.

Furthermore, the cathode in a conventional metal-sulfur cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity of sulfur cathode is typically less than 879 mAh/g 75% of S being utilized) and often less than 586 mAh/g (or <50% in this example) of what could be achieved. In other words, the active material (S) utilization rate is typically less than 75% (or even <50%). This has been a major issue in the art of metal-sulfur cells and there has been no effective solution to this problem. Most surprisingly, the implementation of a porous structure (HA-derived foam) as a conductive supporting material for polysulfide has made it possible to achieve an active material utilization rate of typically >>80%, more often greater than 90%, and, in many cases, close to 95%-99%.

Still another unexpected result of the instant invention is the observation that thinner polysulfide coating leads to more stable charge/discharge cycling with significantly reduced shuttling effect that has been a long-standing impediment to full commercialization of metal-sulfur batteries. We overcome this problem yet, at the same time, achieving a high specific capacity. In all prior art Li—S cells, a higher S loading leads to a faster capacity decay. The shuttling effect is related to the tendency for sulfur or alkali metal polysulfide that forms at the cathode to get dissolved in the solvent and for the dissolved metal polysulfide species to migrate from the cathode to the anode, where they irreversibly react with metal anode (e.g. lithium or sodium) to form species that prevent sulfide from returning back to the cathode during the subsequent discharge operation of the Li—S cell (the detrimental shuttling effect). It seems that the presence of massive hexagonal carbon atomic plane surfaces have been able to prevent or reduce such a dissolution and migration issue.

Further significantly, we have unexpectedly discovered that a $M_xS_y$-preloaded cathode layer is more robust than a S-preloaded cathode layer in terms of maintaining the specific capacity of the cathode. This is likely due to the notion that a $M_xS_y$-preloaded cathode layer has already naturally built in some expanded volume and hence is less prone or more resistant to sulfur volume expansion-induced damage upon repeated charges/discharges.

In some embodiments, the cathode layer can contain a conductive filler, such as carbon black (CB), acetylene black (AB), graphite particles, activated carbon, meso-porous carbon, meso-carbon micro bead (MCMB), carbon nano-tube (CNT), carbon nano-fiber (CNF), carbon fiber, or a combination thereof. These materials (not meso-porous) are merely for use as a conductive filler, not as a support for polysulfide.

The present invention also provides a rechargeable metal-sulfur cell comprising an anode active material layer, an optional anode current collector, a porous separator and/or an electrolyte, an S- or $M_xS_y$-preloaded active cathode layer herein disclosed, and an optional cathode current collector. The metal-sulfur cell can be a lithium-sulfur cell (including a lithium metal-sulfur cell or lithium ion-sulfur cell), sodium-sulfur cell (including a sodium metal-sulfur cell or sodium ion-sulfur cell), potassium-sulfur cell (including potassium metal-sulfur cell or potassium ion-sulfur cell), magnesium metal-sulfur or magnesium-ion sulfur cell, and aluminum-sulfur or aluminum ion-sulfur cell.

In the rechargeable metal-sulfur cell, the electrolyte maybe selected from polymer electrolyte, polymer gel electrolyte, composite electrolyte, ionic liquid electrolyte, non-aqueous liquid electrolyte, soft matter phase electrolyte, solid-state electrolyte, or a combination thereof.

The electrolytic salts to be incorporated into a non-aqueous electrolyte may be selected from a metal salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], lithium bis(oxalato)borate (Li-BOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN$(CF_3SO_2)_2$), sodium trifluoromethanesulfonimide (NaTFSI), and bis-trifluoromethyl sulfonylimide potassium ($KN(CF_3SO_2)_2$), $Mg(AlCl_2EtBu)_2$, $MgCl_2/AlCl_3$, $Mg(ClO_4)_2$, $Mg(OH)_2$, $Al(OH)_3$. Among them, $LiPF_6$, $LiBF_4$ and $LiN(CF_3SO_2)_2$ are preferred for Li—S cells, $NaPF_6$ and $LiBF_4$ for Na—S cells, $KBF_4$ for K—S cells, and $Mg(AlCl_2EtBu)_2$, $MgCl_2/AlCl_3$, $Mg(ClO_4)_2$, $Mg(OH)_2$, and $Al(OH)_3$ for Mg—S or Al—S cells. The content of aforementioned electrolytic salts in the non-aqueous solvent is preferably 0.5 to 3.0 M (mol/L) at the cathode side and 2.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In the present metal-sulfur cell or metal ion-sulfur cell, the anode active material may contain, as an example, lithium metal foil (Li particles, Na metal foil, K metal foil, Mg foil, Al foil, etc.) or a high-capacity anode (e.g. Si, Sn, or $SnO_2$) capable of storing a great amount of lithium (or Na, or K).

At the anode side, when lithium metal or sodium metal is used as the sole anode active material in a Li—S or Na—S cell, there is concern about the formation of lithium dendrites, which could lead to internal shorting and thermal runaway. Herein, we have used two approaches, separately or in combination, to address this dendrite formation issue: one involving the use of a high-concentration electrolyte at the anode side and the other the use of a nano-structure composed of conductive nano-filaments. For the latter, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Nano fibers may be selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof. For instance, a nano-structured electrode can be obtained by electro-spinning of polyacrylonitrile (PAN) into polymer nano-fibers, followed by carbonization of PAN. It may be noted that some of the pores in the structure, as carbonized, are greater than 100 nm and some smaller than 100 nm.

The presently invented cathode active layer may be incorporated in one of at least four broad classes of rechargeable lithium-sulfur cells (or, similarly, for sodium-sulfur, potassium-sulfur, magnesium-sulfur, and aluminum-sulfur cells):

(A) Lithium metal-sulfur with a conventional anode configuration: The cell contains an optional cathode current collector, a presently invented cathode active layer, a separator/electrolyte, and an anode current collector. Potential dendrite formation may be overcome by using the high-concentration electrolyte at the anode.

(B) Lithium metal-sulfur cell with a nano-structured anode configuration: The cell contains an optional cathode current collector, a cathode herein invented, a separator/electrolyte, an optional anode current collector, and a nano-structure to accommodate lithium metal that is deposited back to the anode during a charge or re-charge operation. This nano-structure (web, mat, or paper) of nano-filaments provide a uniform electric field enabling uniform Li metal deposition, reducing the propensity to form dendrites. This configuration can provide a dendrite-free cell for a long and safe cycling behavior.

(C) Lithium ion-sulfur cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode of the instant invention, a separator/electrolyte, and an anode current collector; and (D) Lithium ion-sulfur cell with a nano-structured anode: For instance, the cell contains a web of nano-fibers coated with Si coating or bonded with Si nano particles. The cell also contains an optional cathode current collector, an active cathode layer herein invented, a separator/electrolyte, and an anode current collector. This configuration provides an ultra-high capacity, high energy density, and a safe and long cycle life.

In the lithium-ion sulfur cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant invention, and an optional cathode collector. This cathode current collector is optional because the presently invented layer of porous HA-derived foam structure, if properly designed, can act as a current collector or as an extension of a current collector due to its high electrical and thermal conductivity.

For a sodium ion-sulfur cell or potassium ion-sulfur cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (pre-doped or pre-loaded with Na), and combinations thereof.

The following examples are used to illustrate some specific details about the best modes of practicing the instant invention and should not be construed as limiting the scope of the invention.

Example 1: Humic Acid and Reduced Humic Acid from Leonardite and Production of HA- and HA/Graphene-Derived Foams Humic acid can be extracted from leonardite by dispersing leonardite in a basic aqueous solution (pH of 10) with a very high yield (in the range of 75%). Subsequent acidification of the solution leads to precipitation of humic acid powder. In an experiment, 3 g of leonardite was dissolved by 300 ml of double deionized water containing 1M KOH (or $NH_4OH$) solution under magnetic stirring. The pH value was adjusted to 10. The solution was then filtered to remove any big particles or any residual impurities. The resulting humic acid dispersion, containing HC alone or with the presence of a blowing agent, was cast onto a glass substrate to form a series of films for subsequent heat treatments.

In some samples, a chemical blowing agent (hydrazo dicarbonamide) was added to the suspension just prior to casting. In some samples, graphene oxide (GO) was added into the suspension. The resulting suspension was then cast onto a glass surface using a doctor's blade to exert shear stresses, inducing HA molecular orientations. The resulting HA coating films, after removal of liquid, have a thickness that can be varied from approximately 10 nm to 800 μm (preferably and typically from 50 μm to 500 μm for metal-sulfur battery cathodes).

For making an HA-derived or HA/graphene-derived foam specimen, the HA or HA/graphene coating film was then subjected to heat treatments that typically involve an initial thermal reduction temperature of 80-350° C. for 1-8 hours, followed by heat-treating at a second temperature of 1,500-2,850° C. for 0.5 to 5 hours. It may be noted that we have found it essential to apply a compressive stress to the coating film sample while being subjected to the first heat treatment. This compress stress seems to have helped maintain good contacts between the HA molecules or sheets so that chemical merging and linking between HA molecules or sheets can occur while pores are being formed. Without such a compressive stress, the heat-treated film was typically excessively porous with constituent hexagonal carbon atomic planes in the pore walls being very poorly oriented/positioned, and incapable of chemical merging and linking with one another. As a result, the thermal conductivity, electrical conductivity, and mechanical strength of the graphene foam were severely compromised.

Example 2: Various Blowing Agents and Pore-Forming (Bubble-Producing) Processes

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent. However, a chemical blowing agent cannot be dissolved in a graphene material, which is a solid, not liquid. This presents a challenge to make use of a chemical blowing agent to generate pores or cells in a graphene material.

After extensive experimenting, we have discovered that practically any chemical blowing agent (e.g. in a powder or pellet form) can be used to create pores or bubbles in a dried layer of graphene when the first heat treatment temperature is sufficient to activate the blowing reaction. The chemical blowing agent (powder or pellets) may be dispersed in the liquid medium to become a second component in the suspension, which can be deposited onto the solid supporting substrate to form a wet layer. This wet layer of HA material may then be dried and heat treated to activate the chemical blowing agent. After a chemical blowing agent is activated and bubbles are generated, the resulting foamed HA structure is largely maintained even when subsequently a higher heat treatment temperature is applied to the structure. This is quite unexpected, indeed.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range of 130 to 230° C. (266-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bicarbonate (baking soda), hydrazine, hydrazide, azodicarbonamide (exothermic chemical blowing agents), nitroso compounds (e.g. N, N-Dinitroso pentamethylene tetramine), hydrazine derivatives (e.g. 4. 4'-Oxybis (benzenesulfonyl hydrazide) and Hydrazo dicarbonamide), and hydrogen carbonate (e.g. Sodium hydrogen carbonate). These are all commercially available in plastics industry.

In the production of foamed plastics, physical blowing agents are metered into the plastic melt during foam extrusion or injection molded foaming, or supplied to one of the precursor materials during polyurethane foaming. It has not been previously known that a physical blowing agent can be used to create pores in a HA material, which is in a solid state (not melt). We have surprisingly observed that a physical blowing agent (e.g. $CO_2$ or $N_2$) can be injected into the stream of HA suspension prior to being coated or cast onto the supporting substrate. This would result in a foamed structure even when the liquid medium (e.g. water and/or alcohol) is removed. The dried layer of HA or HA/graphene material is capable of maintaining a controlled amount of pores or bubbles during liquid removal and subsequent heat treatments.

Technically feasible blowing agents include Carbon dioxide ($CO_2$), Nitrogen ($N_2$), Isobutane ($C_4H_{10}$), Cyclopentane ($C_5H_{10}$), Isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Except for those regulated substances, all the blowing agents recited above have been tested in our experiments. For both physical blowing agents and chemical blowing agents, the blowing agent amount introduced into the suspension is defined as a blowing agent-to-HA material weight ratio, which is typically from 0/1.0 to 1.0/1.0.

Example 3: Preparation of Humic Acid from Coal and HA-Derive Foams

In a typical procedure, 300 mg of coal was suspended in concentrated sulfuric acid (60 ml) and nitric acid (20 ml), and followed by cup sonication for 2 h. The reaction was then stirred and heated in an oil bath at 100 or 120° C. for 24 h. The solution was cooled to room temperature and poured into a beaker containing 100 ml ice, followed by a step of adding NaOH (3M) until the pH value reached 7.

In one experiment, the neutral mixture was then filtered through a 0.45-mm polytetrafluoroethylene membrane and the filtrate was dialyzed in 1,000 Da dialysis bag for 5 days. For the larger humic acid sheets, the time can be shortened to 1 to 2 h using cross-flow ultrafiltration. After purification, the solution was concentrated using rotary evaporation to obtain solid humic acid sheets. These humic acid sheets alone and their mixtures with a blowing agent were re-dispersed in a solvent (ethylene glycol and alcohol, separately) to obtain several dispersion samples for subsequent casting or coating.

Various amounts (1%-30% by weight relative to HA material) of chemical bowing agents (N, N-Dinitroso pentamethylene tetramine or 4. 4'-Oxybis (benzenesulfonyl hydrazide) were added to a suspension containing HA sheets. The suspension was then cast onto a glass surface using a doctor's blade to exert shear stresses, inducing orientation and proper positioning of HA molecules or sheets. Several samples were cast, including one that was made using $CO_2$ as a physical blowing agent introduced into the suspension just prior to casting. The resulting HA films, after removal of liquid, have a thickness that can be varied from approximately 1 to 500 μm.

The HA films were then subjected to heat treatments that involve an initial (first) thermal reduction temperature of 80-1,500° C. for 1-5 hours. This first heat treatment generated a HA foam (if HTT is <300° C.) and a foam of large sheet-like HA molecules or domains of hexagonal carbon atomic planes in the pore walls (if HTT is from 300 to 1,500° C.). Some of the foam samples were then subjected to a second temperature of 1,500-2,850° C. to determine if the graphene-like domains of hexagonal carbon atomic planes in the foam wall could be further perfected (graphitized to become more ordered or having a higher degree of crystallinity).

Comparative Example 3-a: CVD Graphene Foams on Ni Foam Templates

The procedure was adapted from that disclosed in open literature: Chen, Z. et al. "Three-dimensional flexible and conductive interconnected graphene networks grown by chemical vapor deposition," Nat. Mater. 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. In order to recover (separate) graphene foam, Ni frame must be etched away. Before etching away the nickel skeleton by a hot HCl (or $FeCl_3$) solution, a thin layer of poly(methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer is critical to preparing a free-standing film of graphene foam; only a severely distorted and deformed graphene foam sample was obtained without the PMMA support layer. This is a tedious process that is not environmentally benign and is not scalable.

Comparative Example 3-b: Conventional Graphitic Foam from Pitch-Based Carbon Foams Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. under a nitrogen blanket and then heat treated in separate runs in a graphite crucible to 2500° C. and 2800° C. in Argon.

Samples from the foam were machined into specimens for measuring the thermal conductivity. The bulk thermal conductivity ranged from 67 W/mK to 151 W/mK. The density of the samples was from 0.31-0.61 g/cm$^3$. When weight is taken into account, the specific thermal conductivity of the pitch derived foam is approximately 67/0.31=216 and 151/0.61=247.5 W/mK per specific gravity (or per physical density).

The compression strength of the samples having an average density of 0.51 g/cm$^3$ was measured to be 3.6 MPa and the compression modulus was measured to be 74 MPa. By contrast, the compression strength and compressive modulus of the presently invented HA-derived graphitic foam having a comparable physical density are 5.7 MPa and 103 MPa, respectively.

Figure 3A:
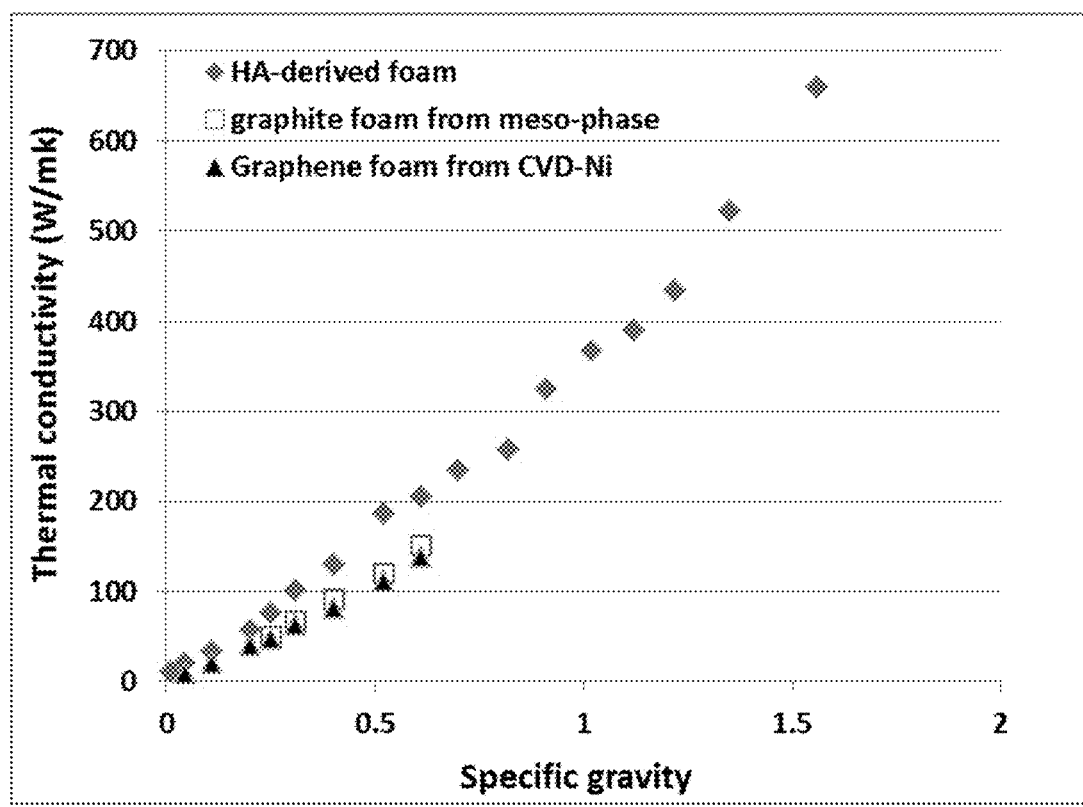
FIG. 3(A) Thermal conductivity values vs. specific gravity of the HA-derived foam produced by the presently invented process, meso-phase pitch-derived graphite foam, and Ni foam-template assisted CVD graphene foam.
Figure 5:
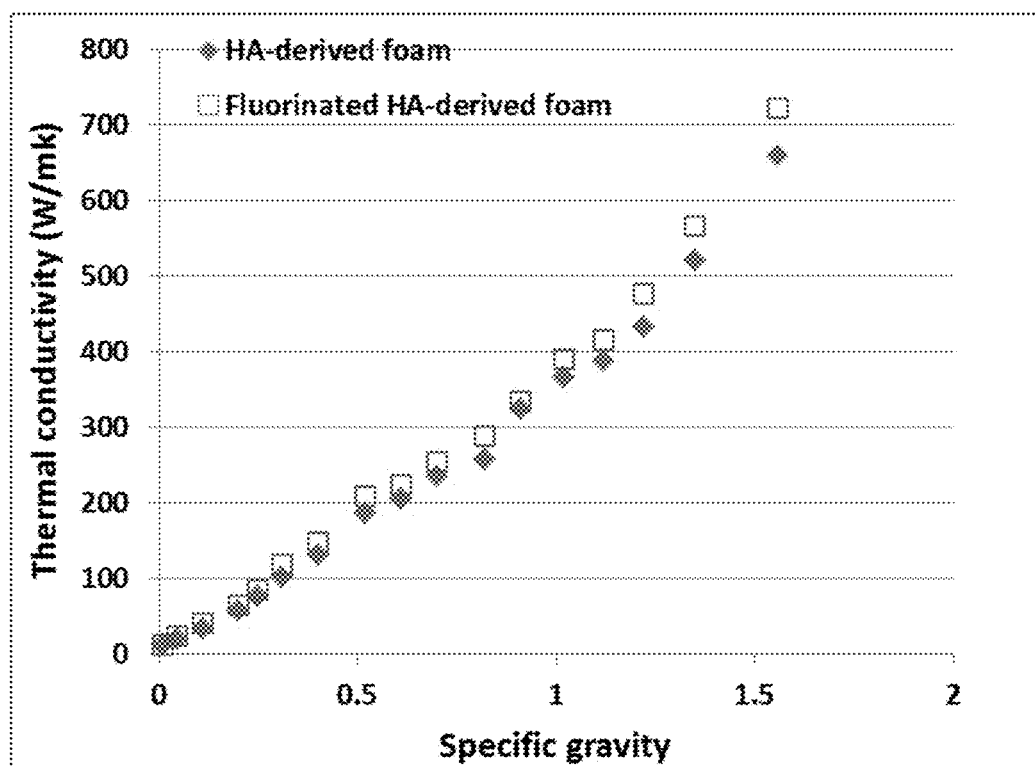
FIG. 5 Thermal conductivity values of the foam samples, derived from HA and fluorinated HA, plotted as a function of the specific gravity.

Shown in FIG. 3(A) are the thermal conductivity values vs. specific gravity of the HA-derived foam, meso-phase pitch-derived graphite foam, and Ni foam template-assisted CVD graphene foam. These data clearly demonstrate the following unexpected results:
1) HA-derived foams produced by the presently invented process exhibit significantly higher thermal conductivity as compared to both meso-phase pitch-derived graphite foam and Ni foam template-assisted CVD graphene, given the same physical density.
2) This is quite surprising in view of the notion that CVD graphene is essentially pristine graphene that has never been exposed to oxidation and should have exhibited a much higher thermal conductivity compared to HA-derived hexagonal carbon atomic planes, which are highly defective (having a high defect population and, hence, low conductivity) after the oxygen-containing functional groups are removed via conventional thermal or chemical reduction methods. These exceptionally high thermal conductivity values observed with the HA-derived graphitic foams herein produced are much to our surprise.
3) Given the same amount of solid material, the presently invented HA-derived foam after a heat treatment at a HTT >1,500° C. is intrinsically most conducting, reflecting a high level of graphitic crystal perfection (larger crystal dimensions, fewer grain boundaries and other defects, better crystal orientation, etc.). This is also unexpected.
4) The specific conductivity values of the presently invented HA-derived foam and fluorinated HA-derived foams (FIG. 5) exhibit values from 250 to 490 W/mK per unit of specific gravity; but those of the other two foam materials are typically lower than 250 W/mK per unit of specific gravity.

Other experimental data also indicate that the HA-derived foams and HA/graphene-derived foams are not only highly conducting (overcoming the low conductivity issues of sulfur or sulfide) but also compatible with sulfur and sulfide, which can adhere pore walls very well. This feature is important for preventing excessive dissolution of sulfur and sulfide in liquid electrolyte; hence, reducing or eliminating the shuttle effect.

Comparative Example 3-c: Preparation of Pristine Graphene Foam (0% Oxygen)

Recognizing the possibility of the high defect population in HA sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication process (also known as the liquid-phase exfoliation in the art).

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N, N-Dinitroso pentamethylene tetramine or 4. 4'-Oxybis (benzenesulfonyl hydrazide) were added to a suspension containing pristine graphene sheets and a surfactant. The suspension was then cast onto a glass surface. Several samples were cast, including one that was made using $CO_2$ as a physical blowing agent introduced into the suspension just prior to casting. The resulting HA or HA/graphene films, after removal of liquid, have a thickness that can be varied from approximately 10 to 500 μm. The films were then subjected to heat treatments at a temperature of 80-1,500° C. for 1-5 hours, which generated a HA- or HA/graphene-derived foam.

Figure 6:
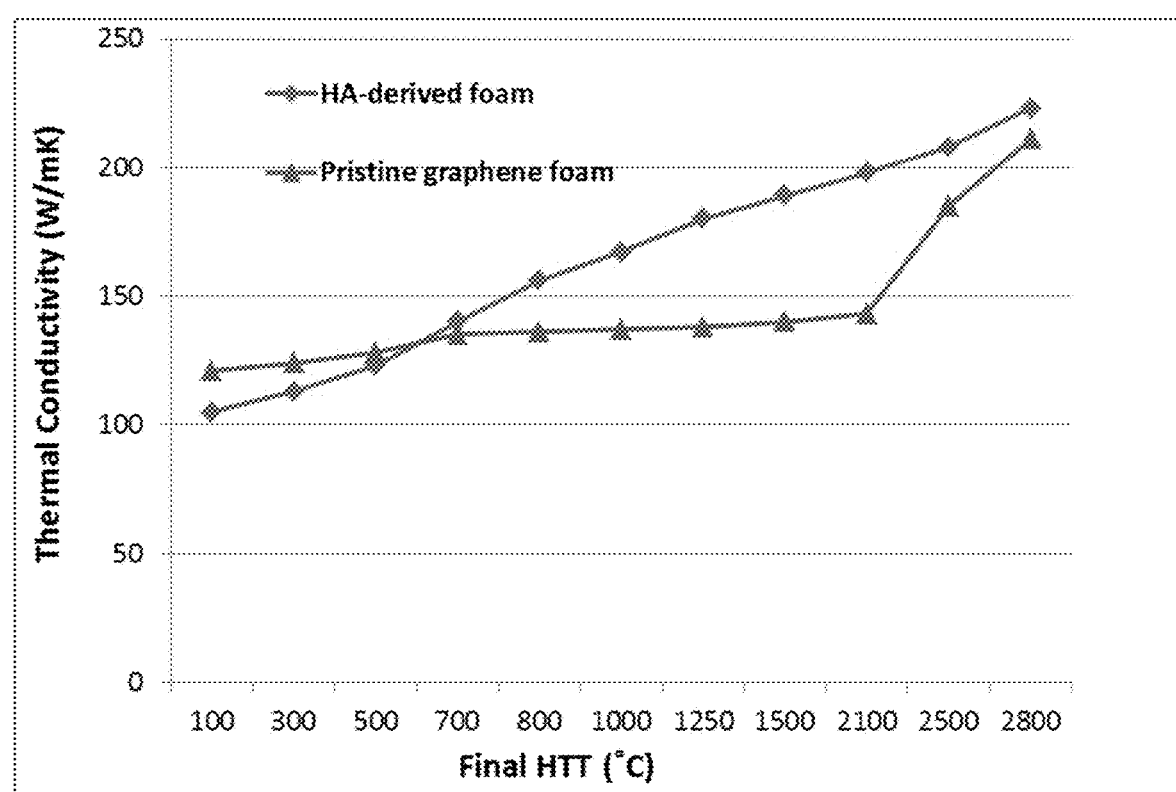
FIG. 6 Thermal conductivity values of foam samples derived from HA and pristine graphene as a function of the final (maximum) heat treatment temperature.

Summarized in FIG. 6 are thermal conductivity data for a series of HA-derived foams and a series of pristine graphene derived foams, both plotted over the same final (maximum) heat treatment temperatures. These data indicate that the thermal conductivity of the HA-derived foams is highly sensitive to the final heat treatment temperature (HTT). Even when the HTT is very low, clearly some type of HA molecular linking and merging or crystal perfection reactions have already been activated. The thermal conductivity increases monotonically with the final HTT. In contrast, the thermal conductivity of pristine graphene foams remains relatively constant until a final HTT of approximately 2,500° C. is reached, signaling the beginning of a re-crystallization and perfection of graphite crystals. There are no functional groups in pristine graphene, such as —COOH and —OH in HA, that enable chemical linking of molecules at relatively low HTTs. With a HTT as low as 1,250° C., HA molecules and resulting hexagonal carbon atomic planes can merge to form significantly larger graphene-like hexagonal carbon sheets with reduced grain boundaries and fewer electron transport path interruptions. Even though HA-derived sheets are intrinsically more defective than pristine graphene, the presently invented process enables the HA molecules to form graphitic foams that outperform pristine graphene foams. This is another unexpected result.

Comparative Example 3-d: Preparation of Graphene Oxide (GO) Suspension from Natural Graphite and Graphene Foams from Hydrothermally Reduced Graphene Oxide Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

A self-assembled graphene hydrogel (SGH) sample was then prepared by a hydrothermal method. In a typical procedure, the SGH can be easily prepared by heating 2 mg/mL of homogeneous graphene oxide (GO) aqueous dispersion sealed in a Teflon-lined autoclave at 180° C. for 12 h. The SGH containing about 2.6% (by weight) graphene sheets and 97.4% water has an electrical conductivity of approximately $5\times10^{-3}$ S/cm. Upon drying and heat treating at 1,500° C., the resulting graphene foam exhibits an electrical conductivity of approximately $1.5\times10^{-1}$ S/cm, which is 2 times lower than those of the presently invented HA-derived foams produced by heat treating at the same temperature.

Comparative Example 3-e: Plastic Bead Template-Assisted Formation of Reduced Graphene Oxide Foams A hard template-directed ordered assembly for a macro-porous bubbled graphene film (MGF) was prepared. Mono-disperse poly methyl methacrylate (PMMA) latex spheres were used as the hard templates. The GO liquid crystal prepared in Comparative Example 3-d above was mixed with a PMMA spheres suspension. Subsequent vacuum filtration was then conducted to prepare the assembly of PMMA spheres and GO sheets, with GO sheets wrapped around the PMMA beads. A composite film was peeled off from the filter, air dried and calcinated at 800° C. to remove the PMMA template and thermally reduce GO into RGO simultaneously. The grey free-standing PMMA/GO film turned black after calcination, while the graphene film remained porous.

Figure 3B:
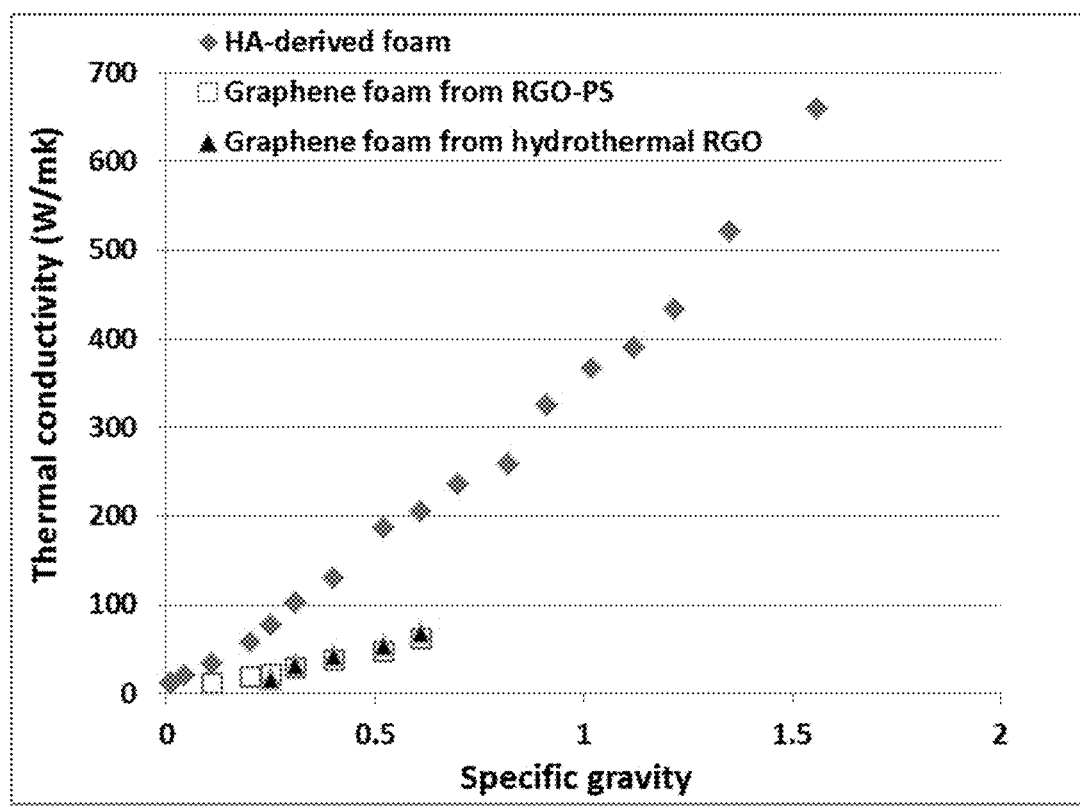
FIG. 3(B) Thermal conductivity values of the HA-derived foam, sacrificial plastic bead-templated GO foam, and the hydrothermally reduced GO graphene foam.
Figure 4:
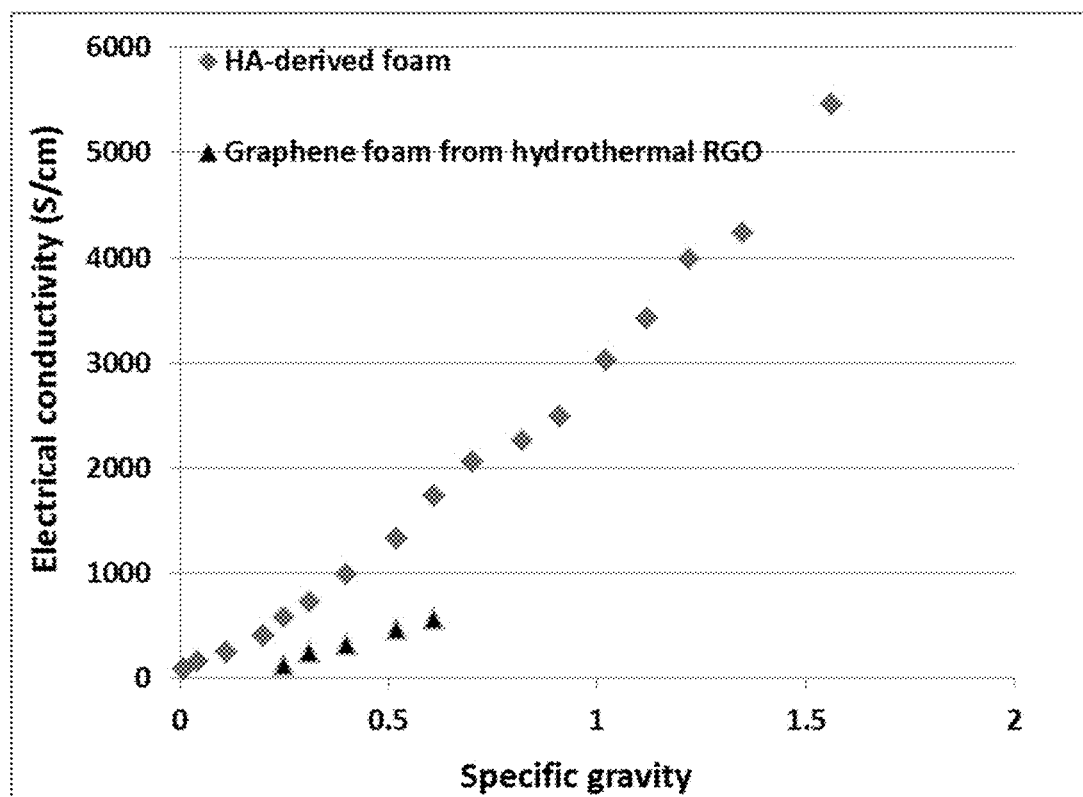
FIG. 4 Electrical conductivity data from the HA-derived foam produced by the presently invented process and the hydrothermally reduced GO graphene foam.

FIG. 3(B) shows the thermal conductivity values of the presently invented HA-derived foam, GO foam produced via sacrificial plastic bead template-assisted process, and hydrothermally reduced GO graphene foam. Most surprisingly, given the same HTTs, the presently invented HA-derived foam exhibits the highest thermal conductivity. Electrical conductivity data summarized in FIG. 4 are also consistent with this conclusion. These data further support the notion that, given the same amount of solid material, the presently invented HA suspension deposition (with stress-induced orientation) and subsequent heat treatments give rise to a HA-derived foam that is intrinsically most conducting, reflecting a highest level of graphitic crystal perfection (larger crystal dimensions, fewer grain boundaries and other defects, better crystal orientation, etc. along the pore walls).

It is of significance to point out that all the prior art processes for producing graphite foams or graphene foams appear to provide macro-porous foams having a physical density in the range of approximately 0.2-0.6 g/cm³ only with pore sizes being typically too large (e.g. from 20 to 300 μm) for most of the intended applications. In contrast, the instant invention provides processes that generate HA-derived foams having a density that can be as low as 0.01 g/cm³ and as high as 1.7 g/cm³. The pore sizes can be varied between meso-scaled (2-50 nm) up to macro-scaled (1-500 μm) depending upon the contents of non-carbon elements and the amount/type of blowing agent used. This level of flexibility and versatility in designing various types of graphitic foams is unprecedented and un-matched by any prior art process.

Examples 4: Preparation of Fluorinated HA Foams

In a typical procedure, a sheet of HA-derived foam was fluorinated by vapors of chlorine trifluoride in a sealed autoclave reactor to yield fluorinated HA-carbon hybrid film. Different durations of fluorination time were allowed for achieving different degrees of fluorination. Sheets of fluorinated HA-derived foam were then separately immersed in containers each containing a metal polysulfide solution. On a separate basis, several sheets of foam were exposed to sulfur vapor for physical vapor infiltration of sulfur into pores of HA-derived foam.

Example 5: Preparation of Nitrogenated HA Foams

Several pieces of HA-derived foam prepared in Example 3 were immersed in a 30% $H_2O_2$-water solution for a period of 2-48 hours to obtain oxidized HA-derived foams, having a controlled oxygen content of 2-25% by weight.

Some oxidized HA-derived foam samples were mixed with different proportions of urea and the mixtures were heated in a microwave reactor (900 W) for 0.5 to 5 minutes. The products were washed several times with deionized water and vacuum dried. The products obtained were nitrogenated HA foam. The nitrogen contents were from 3% to 17.5 wt. %, as measured by elemental analysis.

It may be noted that different functionalization treatments of the HA-derived foam were for different purposes. For instance, oxidized HA foam structures are particularly effective as an absorber of polar solvent containing metal salt dissolved therein. Nitrogenated foams were more effective in up-taking other types of solutions.

Example 6: Characterization of Various HA-Derived Foams and Conventional Graphite Foam The internal structures (crystal structure and orientation) of several series of HA-carbon foam materials were investigated using X-ray diffraction. The X-ray diffraction curve of natural graphite typically exhibits a peak at approximately 2θ=26°, corresponds to an inter-graphene spacing ($d_{002}$) of approximately 0.3345 nm. The RHA walls of the hybrid foam materials exhibit a $d_{002}$ spacing typically from 0.3345 nm to 0.40 nm, but more typically up to 0.34 nm.

With a heat treatment temperature of 2,750° C. for the foam structure under compression for one hour, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene-like planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range of 0.2-0.5. In contrast, a graphene foam prepared with a final HTT of 2,750° C. for one hour exhibits a I(004)/I(002) ratio of 0.78 and a Mosaic spread value of 0.21, indicating the pore walls being a practically perfect graphite single crystal with a good degree of preferred orientation (if prepared under a compression force).

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our HA-derived foams have a mosaic spread value in this range of 0.3-0.6 when produced using a final heat treatment temperature no less than 2,500° C.

It is of significance to point out that a heat treatment temperature as low as 500° C. is sufficient to bring the average inter-planar spacing between hexagonal carbon atomic planes along the pore walls to below 0.4 nm, getting closer and closer to that of natural graphite or that of a graphite single crystal. The beauty of this approach is the notion that this HA suspension coating and heat treating strategy has enabled us to organize, orient/align, and chemically merge the planar HA molecules into a unified structure with all the graphene-like hexagonal carbon atomic planes now being larger in lateral dimensions (significantly larger than the length and width of the original HA molecules). A potential chemical linking and merging mechanism is illustrated in FIG. 3. This has given rise to exceptional thermal conductivity and electrical conductivity values.

Example 7: Deposition of Metal Polysulfide in Various HA-Derived Foams Prepared in Previous Examples for Metal-Sulfur Batteries The deposition of metal polysulfide was conducted before the cathode active layer was incorporated into a metal-sulfur battery cell (Li—S, Na—S, K—S, Mg—S, or Al—S cell).

In a typical procedure, sulfur or a metal polysulfide ($M_xS_y$) is dissolved in a solvent (e.g. mixture of DOL/DME in a volume ratio from 1:3 to 3:1) to form an electrolyte solution. Several types of metal polysulfide materials are commercially available. A wide variety of solvents can be utilized for this purpose and there is no theoretical limit to what type of solvents can be used; any solvent can be used provided that there is some solubility of the elemental sulfur, polymeric sulfur, carbon-sulfide, or metal polysulfide in this desired solvent. A greater solubility would mean a larger amount of sulfur or sulfide can be precipitated out from the electrolyte solution and deposited in the porous structure.

For those commercially unavailable metal polysulfide materials, one can readily prepare them in a lab setting. As a series of examples, lithium polysulfide ($Li_xS_y$) and sodium polysulfide ($Na_xS_y$) with desired x and y values (e.g. x=2, and y=6-10) dissolved in solvent were prepared by chemically reacting stoichiometric amounts of sulfur and $Li_2S$ or $Na_2S$ in polysulfide free electrolyte of 0.5 M LiTFSI+0.2 M $LiNO_3$ (or 0.5 M NaTFSI+0.2 M $NaNO_3$) in DOL/DME (1:1, v:v). The electrolyte was stirred at 75° C. for 3-7 hours and then at room temperature for 48 hours. The resulting electrolytes contain different $Li_xS_y$ or $Na_xS_y$ species (e.g. x=2, and y=6-10, depending upon reaction times and temperatures), which are intended for use as a sulfur source in a battery cell.

Several methods were utilized to introduce polysulfide-solvent solution into the pores of the conductive porous structure. One method entailed drawing a desired amount of solution into a syringe, which was then discharged and dispensed onto the surface of a HA-derived foam. In most cases, the solution naturally permeates into the pores. Another method involved using a lab-scale liquid sprayer to spray the solution over the porous structure. Yet another method included dipping the entire porous structure (foam) into the solution for a desired period of time. In all methods, precipitation of metal polysulfide occurred upon removal of the solvent. This drying procedure allows the precipitated polysulfide to deposit onto the internal walls of the pores in a thin coating form, or to form nano particles that simply lodge in the pores of the porous structure.

Some examples of the metal polysulfide ($M_xS_y$) materials, solvents, porous foams used in the present study are presented in Table 1 below.

TABLE 1

Selected examples of the metal polysulfide materials, solvents used for forming polysulfide solution, and conductive foam structures used in the present study.

| $M_xS_y$ | Solvent | Type of foam structure in the cathode |
|---|---|---|
| $Li_2S_6$ | DOL/DME | HA-derived foam |
| $Li_2S_9$ | DOL/DME | HA-derived foam |
| $Li_2S_{10}$ | DOL/DME | HA-derived foam |
| $Na_2S_2$ | Tetra ethylene glycol dimethyl ether (TEGDME) | HA/GO-derived foam |
| $Na_2S_4$ | TEGDME | HA/GO-derived foam |
| $Na_2S_6$ | TEGDME | HA/GO-derived foam |
| $K_2S_6$ | TEGDME | HA/graphene-derived foam |
| $K_2S_4$ | Diglyme/tetraglyme | HA-derived foam, nitrogenated |
| $K_2S$ | Diglyme/tetraglyme | HA-derived foam, fluorinated |
| $MgS_6$ | Diglyme/tetraglyme | HA-derived foam; for Mg—S and Al—S cells |
| $MgS_4$ | Diglyme/tetraglyme | HA-derived foam; for Mg—S and Al—S cells |
| $CuS_2$ | $NH_4OH$ or HCl or $H_2SO_4$ | HA-derived foam |
| $Cu_8S_5$ | $NH_4OH$ or HCl or $H_2SO_4$ | HA-derived foam |
| ZnS | $H_2SO_4$ solution | HA/GO-derived foam: for Al—S cells |
| $Al_2S_3$ | $H_2SO_4$ | HA/GO-derived foam: for Al—S cells |
| $SnS_2$ | $HNO_3$ and HCl | HA/GO-derived foam, nitrogenated |
| SnS | HCl | HA/GO-derived foam, fluorinated |

In a metal-sulfur cell, a proper electrolyte was selected to combine with an anode current collector (Cu foil), an anode layer (e.g. Li metal foil, Na particles, K particles, Mg foil, or Al foil chemically cleaned), a porous separator, a layer of conductive porous structure, and a cathode current collector (Al foil) to form a Li—S cell, a room temperature Na—S cell, a K—S cell, a Mg—S cell, and a Al—S cell, respectively. The cell was then subjected to a first discharge or charge procedure using a current density preferably ranging from 50 mA/g to 5 A/g.

Sulfur vapor was also introduced into a chamber wherein pieces of HA-derived foam were properly positioned to receive sulfur vapor, which naturally permeates into pores of the foam structures.

For comparison purposes, several prior art methods were used to incorporate sulfur (the cathode active material) in the cathode layer; e.g. direct mixing of S powder with carbon black particles, physical vapor deposition of S in a carbon paper (e.g. carbon nano-fiber, CNF), direct mixing lithium polysulfide particles with a conductive filler (e.g. carbon nanotubes), etc.

Example 8: Chemical Reaction-Induced Deposition of Sulfur Particles or Coating

A chemical deposition method was also herein utilized to prepare S-impregnated HA-derived foam structures. In one typical experiment, the procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a sulfur-impregnated foam sample was prepared by a chemical deposition method in an aqueous solution. First, pieces of HA-derived foam were dipped into the $Na_2S_x$ solution, in the presence of 5 wt. % surfactant cetyl trimethyl-ammonium bromide (CTAB). Then, 100 ml of 2 mol/L HCOOH solution was added into the $Na_2S_x$ solution at a rate of 30-40 drops/min. Finally, the product (basically sulfur-impregnated foam) was washed with acetone and distilled water several times to eliminate salts and impurities. The resulting product was dried at 50° C. in a drying oven for 48 hours. The reaction may be represented by the following reaction: $S_x^{2-}+2H^+ \rightarrow (x-1) S+H_2S$.

Example 9: Redox Chemical Reaction-Induced Deposition of Sulfur Particles or Coating In this chemical reaction-based deposition process, sodium thiosulfate ($Na_2S_2O_3$) was used as a sulfur source and HCl as a reactant. The two reactants (HCl and $Na_2S_2O_3$) were then dispersed and dissolved in water to form a solution. A piece of HA-derived foam was then immersed into this solution. A chemical reaction was allowed to proceed at 25-75° C. for 1-3 hours, leading to the precipitation of S particles deposited in pores of the foam. The reaction may be represented by the following reaction: $2HCl+Na_2S_2O_3$ 2 $NaCl+S\lor+SO_2\downarrow+H_2O$.

Comparative Example 9A: Preparation of S/MC and S/CB Nanocomposites Via Solution Deposition Meso-porous carbon (MC) and, separately, carbon black particles and S were mixed and dispersed in a solvent ($CS_2$) to form a suspension. After thorough stirring, the solvent was evaporated to yield a solid nanocomposite, which was then ground to yield nanocomposite powder. The primary sulfur particles in these nanocomposite particles have an average diameter of approximately 10-30 nm.

Comparative Examples 9B: Preparation of Sulfur-Deposited Webs and Foams

The step involves deposition of elemental sulfur on meso-porous structures through, for instance, a sublimation-based physical vapor deposition. Sublimation of solid sulfur occurs at a temperature greater than 20° C., but a significant sublimation rate typically does not occur until the temperature is above 40° C. In a typical procedure, a meso-porous structure, a nano-filament web, and a HA-derived foam were sealed in a glass tube with the solid sulfur positioned at one end of the tube and the web near another end at a temperature of 40-75° C. The sulfur vapor exposure time was typically from several minutes to several hours for a sulfur coating of several nanometers to several microns in thickness. A sulfur coating thickness lower than 100 nm is preferred, but more preferred is a thickness lower than 20 nm, most preferred lower than 10 nm or even 5 nm.

Several series of alkali metal and alkali metal-ion cells were prepared using the presently prepared cathode. For instance, for the Li—S cells, the first series is a Li metal cell containing a copper foil as an anode current collector and the second series is also a Li metal cell having a nano-structured anode of conductive filaments (based on electro-spun carbon fibers) plus a copper foil current collector. The third series is a Li-ion cell having a nano-structured anode of conductive filaments (based on electro-spun carbon fibers coated with a thin layer of Si using CVD) plus a copper foil current collector. The fourth series is a Li-ion cell having a graphite-based anode active material as an example of the more conventional anode.

Example 10: Evaluation of Electrochemical Performance of Various Metal-Sulfur Cells Charge storage capacities were measured periodically and recorded as a function of the number of cycles. The specific discharge capacity herein referred to is the total charge inserted into the cathode during the discharge, per unit mass of the composite cathode (counting the weights of the cathode active material, conductive additive or foam structure, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Active material utilization efficiency data from many samples or cells investigated are summarized in Table 2 and Table 3 below:

TABLE 2

Sulfur utilization efficiency data for alkali metal-sulfur cell cathodes containing various S contents, polysulfide coating thicknesses or particle diameters, porous structure materials.

| Sample ID | Cathode active layer material | Equivalent S % (assuming 100% conversion from $M_xS_y$ to S) and polysulfide thickness or diameter (nm) | Cathode discharge capacity (mAh/g) | Discharge capacity, mAh/g, based on S weight | Active material utilization efficiency |
|---|---|---|---|---|---|
| HA-1 | HA-derived foam | $Li_2S_{10}$; 90% S; 7.3 nm | 1388 | 1542 | 92.07% |
| HA-2 | HA-derived foam | $Li_2S_{10}$; 90% S; 13.3 nm | 1305 | 1450 | 86.57% |
| HA-3 | HA-derived foam | $Li_2S_{10}$; 75% S; 13.4 nm | 1052 | 1403 | 83.74% |
| HA-C-1 | CNT mat | 75% S (PVD) + CNT | 660 | 880 | 52.54% |
| HA-C-2 | CNT mat | 75% S; $Li_2S_{10}$ + CNT | 690 | 920 | 54.93% |

TABLE 2-continued

Sulfur utilization efficiency data for alkali metal-sulfur cell cathodes containing various S contents, polysulfide coating thicknesses or particle diameters, porous structure materials.

| Sample ID | Cathode active layer material | Equivalent S % (assuming 100% conversion from $M_xS_y$ to S) and polysulfide thickness or diameter (nm) | Cathode discharge capacity (mAh/g) | Discharge capacity, mAh/g, based on S weight | Active material utilization efficiency |
|---|---|---|---|---|---|
| HA-C-3 | Carbon black | 75% S; $Li_2S_{10}$ + CB | 415 | 553 | 33.03% |
| HGO-1 | HA/GO-derived foam | $Li_2S_6$; 85% S; 13.4 nm | 1185 | 1394 | 83.23% |
| HGO-2 | HA/GO-derived foam | 85% S, Chem. reaction | 1033.7 | 1299 | 75.58% |
| HGO-3 | HA/GO-derived foam | $Na_2S_6$; 85%S; 13.4 nm | 1107.8 | 1303 | 77.81% |
| RGO-C | RGO | $Na_2S_6$; 85% S; ball-milled | 983.3 | 1157 | 69.06% |
| NGO-1 | HA-derived, nitrogenated | $Na_2S_4$; 65% S; 13.4 nm | 893 | 1374 | 82.02% |
| NGO-2 | HA-derived, nitrogenated | $K_2S_6$; 65% S; 10.2 nm | 877 | 1349 | 80.55% |
| f-GO-1 | f-GO (fluorinated) | $K_2S_8$; 70% S; 10.2 nm | 989.3 | 1413 | 84.38% |
| f-HA-1 | f-HA (fluorinated) | $Li_2S_8$; 85% S; 7.6 nm | 1297 | 1526 | 91.10% |
| HG-1 | HA/graphene-derived | $Na_2S_6$; 85% S; 15.4 nm | 1198 | 1409 | 84.14% |
| HG-2 | HA/graphene-derived | $K_2S_6$; 85% S; 14.4 nm | 1167 | 1373 | 81.97% |
| EG-3C | CNT | $Na_2S_6$; 85% S; 34 nm | 944 | 1111 | 66.30% |

TABLE 3

Active material utilization efficiency data for alkali metal-sulfur cell cathodes containing various S contents, polysulfide coating thicknesses or particle diameters, porous structure materials.

| Sample ID | Cathode active layer material | Equivalent S % (assuming 100% conversion from $M_xS_y$ to S) and polysulfide thickness or diameter (nm) | Cathode discharge capacity (mAh/g) | Discharge capacity, mAh/g, based on S weight | Active material utilization efficiency |
|---|---|---|---|---|---|
| CSC-1 | HA-derived | $Li_2S_{10}$; 90% S; 8.4 nm | 1365 | 1517 | 90.6% |
| CSC-2 | HA-derived | $Li_2S_{10}$; 90% S; 15.3 nm | 1293 | 1437 | 85.8% |
| CSC-3 | HA-derived | $Li_2S_{10}$; 75% S; 16.2 nm | 1038 | 1384 | 82.6% |
| CSC-c1 | HA-derived | 75% S (PVD) | 926 | 1235 | 74% |
| CSC-c2 | CB | 75% S + CB; ball-milled | 668 | 891 | 53.25% |
| HOG-v | HA/GO-derived | $Li_2S_6$; 85% S; 13.4 nm | 1263 | 1506 | 90.1% |
| HOG-ch | HA/GO-derived | 85% S, Chem. reaction | 1033 | 1454 | 85.7% |
| HG-1 | HA/G-derived | $Na_2S_6$; 85% S; 13.4 nm | 1022 | 1460 | 87.16% |
| HG-2 | HA/G-derived | $Na_2S_6$; 85% S; Chem. | 987 | 1390 | 82.5% |
| HA-CN1 | HA + CNT | $Na_2S_4$; 65% S; 13.4 nm | 1010 | 1342 | 81.2% |
| HA-CN2 | HA + CNT | $K_2S_6$; 65% S; 11.2 nm | 1025 | 1362 | 82.4% |
| C-CNF | C-CNF | $K_2S_8$; 65% S; 14.4 nm | 913 | 1288 | 76% |
| Al-1 | HA/GO-derived | $Li_2S_8$; 85% S; 7.6 nm | 1254 | 1475 | 88.08% |
| Al-2 | HA/GO-derived | $Na_2S_6$; 85% S; 15.4 nm | 1202 | 1414 | 84.42% |
| Mg-1 | HA-derived | $K_2S_6$; 85% S; 26.4 nm | 1088 | 1280 | 76.42% |
| Mg-2 | HA-derived | $Na_2S_6$; 85% S; 34 nm | 1138 | 1237 | 73.85% |

The following observations can be made from the data of Table 2 and Table 3:

1) Compared to other means of protecting cathode active materials and facilitating a higher sulfur utilization efficiency in a metal-sulfur cell, both HA-derived and HA/graphene-derived foams are the most effective.
2) Both HA-derived and HA/graphene-derived foams are conducive to deposition of a high $M_xS_y$ proportion while maintaining a thin $M_xS_y$ coating (hence, high active material utilization efficiency) for alkali metal-sulfur cells. Other materials, such as CNT-based mats, are not capable of achieving both.
3) Thinner $M_xS_y$ coatings on pore walls in HA-derived foam prepared according to the instant invention lead to higher active material utilization efficiency given comparable S proportion.
4) For all alkali metal-sulfur cells and aluminum-sulfur cells, the sulfur utilization efficiency is typically in the range of 81-91%. This has not been possible for prior art sulfur cathodes.

Figure 7:
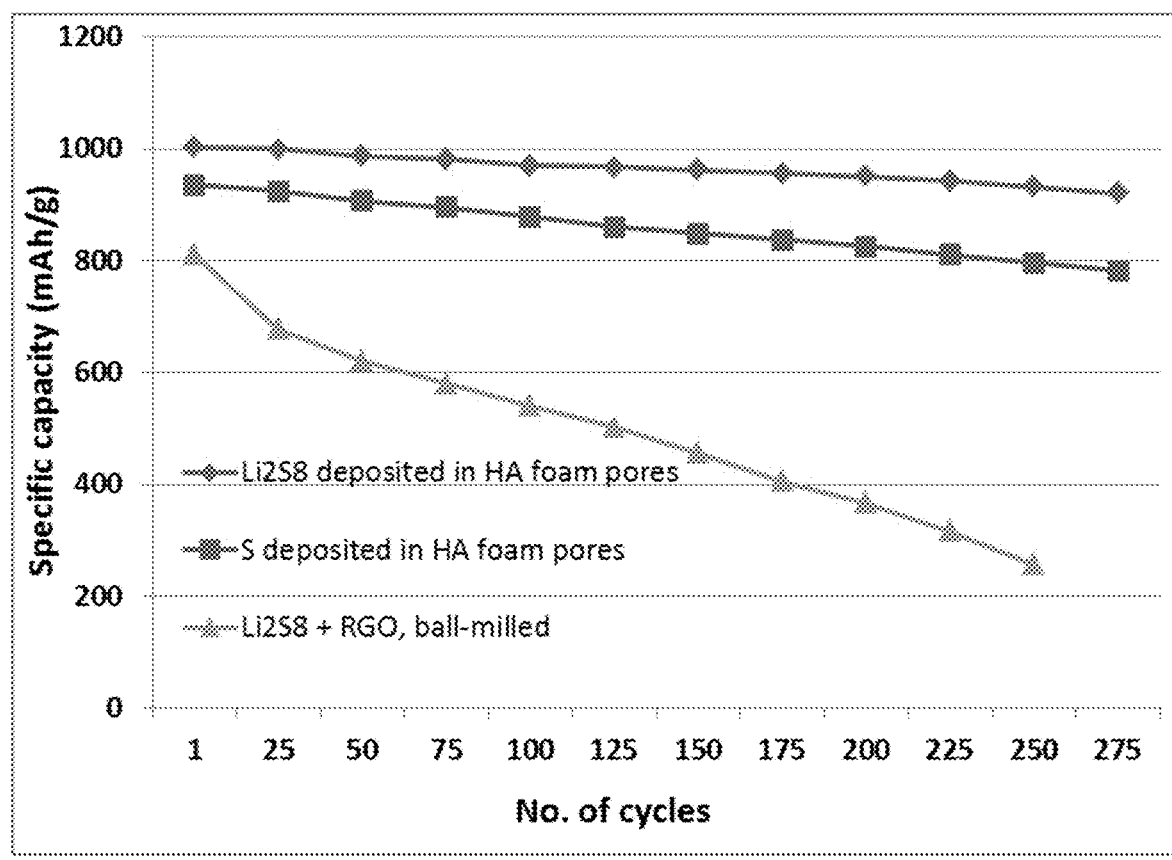
FIG. 7 The specific capacities vs. number of charge/discharge cycles for three Li—S cells: one featuring a HA-derived foam cathode containing solution deposited $Li_2S_8$ coating, one featuring a cathode of physical vapor deposited sulfur in HA-derived foam, and one containing a cathode containing RGO and sulfur ball-milled together FIG. 8 The specific capacities vs. number of charge/discharge cycles for 3 Na—S cells: one featuring a cathode made of HA-derived foam containing solution deposited $Na_2S_8$ coating in the pores, one containing vapor deposited sulfur in the pores of HA-derived foam, and one containing a cathode containing carbon black and sulfur ball-milled together FIG. 9 The cycling behaviors of a Li—S cell featuring a $Li_2S_1$-loaded HA-derived foam structure and a Li—S cell featuring a $Li_2S_9$-loaded HA-derived foam structure.

Shown in FIG. 7 are the specific capacities vs. number of charge/discharge cycles for three Li—S cells: one featuring a HA-derived foam cathode containing solution deposited $Li_2S_8$ coating of the present invention, one featuring a sulfur cathode of physical vapor deposited sulfur in HA-derived foam, and one containing a cathode containing RGO and sulfur ball-milled together.

These data indicate that, as a non-limiting example, the presently invented Li—S cell featuring a HA-derived foam impregnated with solution-deposited metal sulfide as a sulfur source does not exhibit any significant decay (only 8.3%) after 275 cycles. The cell containing a cathode of sulfur vapor deposited S coating-infiltrated HA foam experiences a 16.4% capacity decay after 275 cycles. The cathode containing ball-milled mixture of RGO and $Li_2S_8$ suffers a 68.3% capacity decay after 250 cycles. The cycle life of a lithium battery cell is usually defined as the number of cycles when the cell reaches 80% of its original capacity. With this definition, the prior art Li—S cell featuring a cathode containing ball-milled S/RGO shows a life of 50 cycles. These results are quite unexpected considering that the same amount of sulfur was incorporated in these three cell cathodes.

Figure 8:
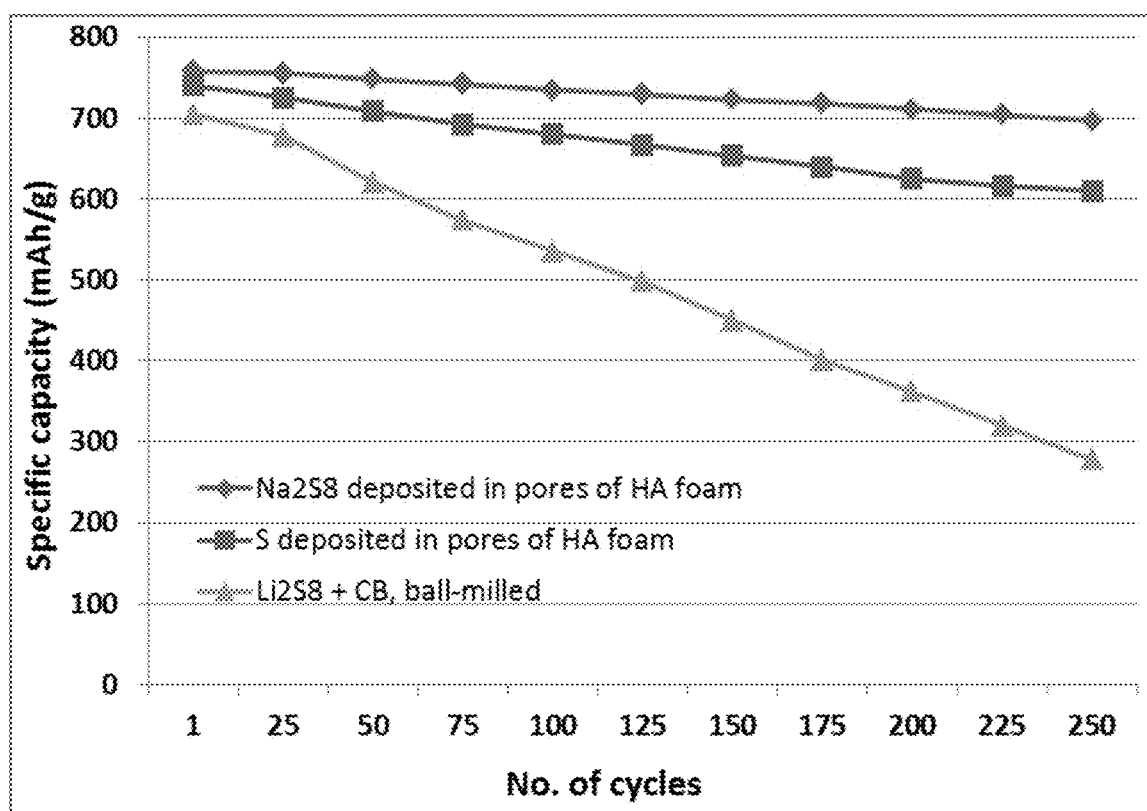

The cycling stability of the cathode featuring nano $Li_2S_8$-deposited HA-derived foam might be due to the effectiveness of the presently invented foam and deposition method to uniformly deposit ultra-thin sulfur coating in the mesopores in the porous structure and to retain the outstanding ability of the pore walls to retain thin sulfur coating, preventing dissolution of sulfur and polysulfide during battery operations. Additionally, as compared to pure S, the $Li_2S_8$ coating appears to be more resistant to electrode disintegration caused by cathode volume changes. This is likely due to the notion that a $M_xS_y$-preloaded cathode layer has already naturally built in some expanded volume and hence is less prone to sulfur volume expansion-induced damage upon repeated charges/discharges Similarly, FIG. 8 shows the specific capacities vs. number of charge/discharge cycles for 3 Na—S cells: one featuring a cathode made of HA-derived foam containing solution deposited $Na_2S_8$ coating in the pores, one containing vapor deposited sulfur in the pores of HA-derived foam, and one containing a cathode containing carbon black and sulfur ball-milled together. The presently invented $M_xS_y$ deposition and HA-derived form approach provides the most cycling-stable Na—S cell.

Although one might be able to use $Li_2S_1$, $Li_2S_2$, $Li_2S_3$, and $Li_2S_4$, in the presently invented cathode active layer, we have found some unexpected disadvantages or limitations of using $Li_2S_y$, where y=1-4. For instance, there is limited solubility of $Li_2S_1$ and $Li_2S_2$ in most of the solvents and, hence, it is difficult to incorporate any significant proportion of $Li_2S_1$ and $Li_2S_2$ in the porous structure. Further, there are limited sulfur contents in the resulting cathode when $Li_2S_1$ and $Li_2S_2$ are used to load the pores of the porous structure. This implies that the theoretical capacities of $Li_2S_1$ and $Li_2S_2$ are 1,167 and 1,377 mAh/g, respectively, even though pure sulfur provides the theoretical capacity of 1,675 mAh/g. Furthermore, quite unexpectedly and significantly, there is a significant degree of irreversibility of $Li_2S_1$ and $Li_2S_2$ when they are deposited in the porous structure. These issues, in combination, have surprisingly led to relatively low sulfur content and low sulfur utilization efficiency in the cathode, as well as poor cycling stability. In contrast, for instance, $Li_2S_9$ has a theoretical capacity of 1,598 mAh/g, is highly soluble in several desirable solvents (yet, well confined by the pores of the invented conductive pore), enables highly reversible reaction of the cathode active material, and is conducive to cycling stability.

Figure 9:
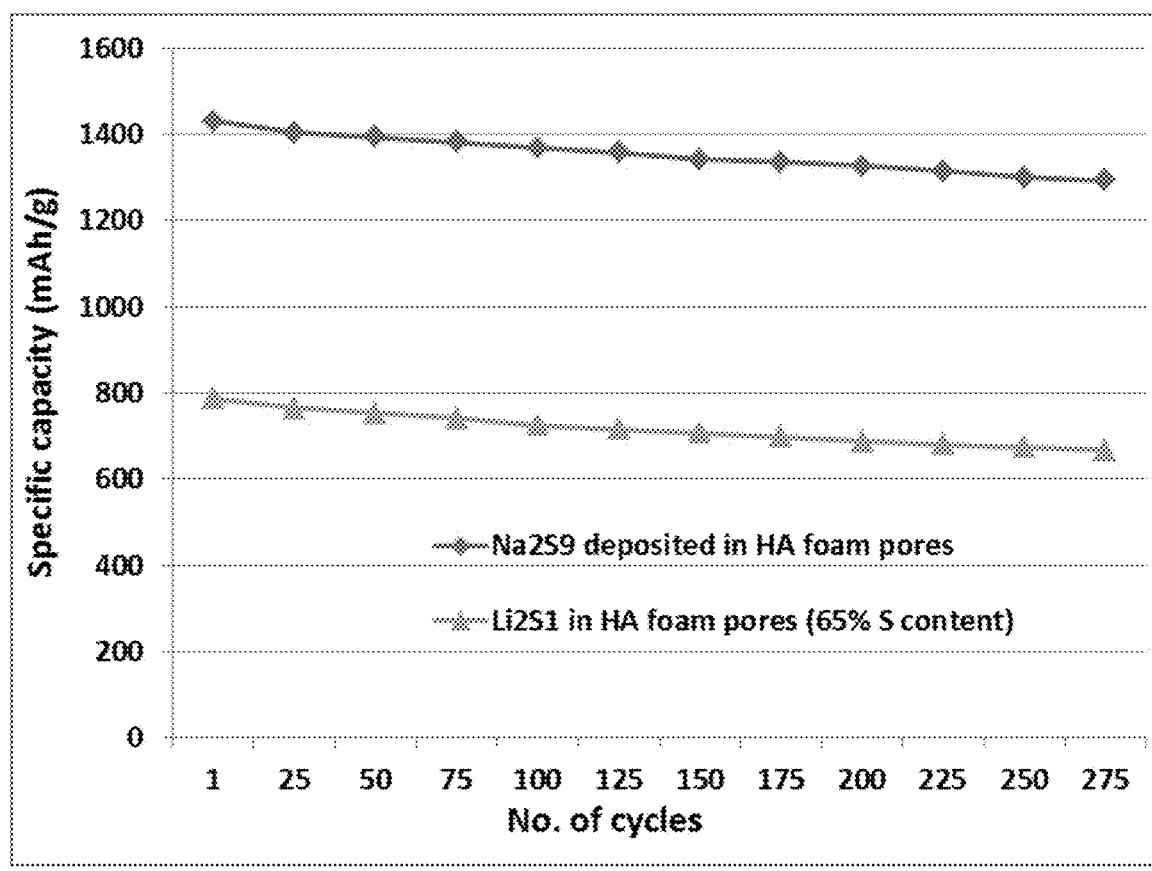

The advantages of the instant invention are further demonstrated in FIG. 9, which indicates the cycling behaviors of a Li—S cell featuring a $Li_2S_1$-loaded HA-derived foam structure and a Li—S cell featuring a $Li_2S_9$-loaded HA-derived foam structure. We have attempted to incorporate as much $Li_2S_1$ as we can into the cathode foam structure, but the resulting composite cathode delivers a best specific capacity of only 786 mAh/g (based on the total composite cathode weight). This capacity rapidly decays to 667 mAh/g (a loss of 15.2%) after 275 cycles. In contrast, the Li—S cell featuring a $Li_2S_9$-loaded graphene porous structure at the cathode delivers a capacity of 1,430 mAh/g, which decays by 9.7% to 1,292 mAh/g after 275 cycles.

Further unexpectedly, $Na_2S_1$, $Na_2S_2$, $Na_2S_3$, and $Na_2S_4$ do not have these irreversibility and cycling instability issues as in their lithium counterparts.

In summary, the present invention provides an innovative, versatile, and surprisingly effective platform materials technology that enables the design and manufacture of superior metal-sulfur rechargeable batteries. The metal-sulfur cell featuring a cathode containing a conductive, HA-derived foam with ultra-thin cathode active sulfur or $M_xS_y$ deposited thereon exhibits a high cathode active material utilization rate, high specific capacity, little or no shuttling effect, and long cycle life.

We have successfully developed an absolutely new, novel, unexpected, and patently distinct class of HA foam or HA-derived graphitic foam materials for accommodating sulfur or polysulfide and related processes of production. The chemical composition (% of oxygen, fluorine, and other non-carbon elements), structure (crystal perfection, grain size, defect population, etc), crystal orientation, morphology, process of production, and properties of this new class of foam materials are fundamentally different and patently distinct from meso-phase pitch-derived graphite foam, CVD graphene-derived foam, and graphene foams from hydrothermal reduction of GO, and sacrificial bead template-assisted RGO foam. The thermal conductivity, electrical conductivity, elastic modulus, and flexural strength exhibited by the presently invented foam materials are much higher than those of prior art foam materials.

We claim:

1. A process for producing sulfur cathode for a metal-sulfur battery, said process comprising:
   (a) preparing a humic acid dispersion having multiple humic acid molecules and optional graphene sheets dispersed in a liquid medium, wherein said humic acid is selected from the group consisting of oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, and a combinations thereof and wherein said dispersion contains a blowing agent having a blowing agent-to-humic acid weight ratio from 0/1.0 to 1.0/1.0;
   (b) dispensing and depositing said humic acid dispersion onto a surface of a supporting substrate to form a wet layer of humic acid and partially or completely removing said liquid medium from the wet layer of humic acid to form a dried layer of humic acid;
   (c) heat treating the dried layer of humic acid at a first heat treatment temperature from 80° C. to 3,200° C. at a desired heating rate sufficient to induce volatile gas molecules from non-carbon elements or to activate said blowing agent for producing a humic acid-derived foam, wherein a porosity is substantially open cell and said pore walls contain single-layer or few-layer humic acid-derived hexagonal carbon atomic planes, said few-layer hexagonal carbon atomic planes have 2-10 layers of stacked hexagonal carbon atomic planes having an inter-plane spacing $d_{002}$ from 0.3354 nm to 0.60 nm as measured by X-ray diffraction, and said single-layer or few-layer hexagonal carbon atomic planes contain 0.01% to 25% by weight of non-carbon elements; and
   (d) impregnating said foam with sulfur or sulfide in a form of thin particles or a coating, having a diameter or thickness less than 500 nm, which are lodged in said pores or deposited on said pore walls.

2. The process of claim 1, wherein said dispensing and depositing procedure includes subjecting said humic acid dispersion to an orientation-inducing stress.

3. The process of claim 1, further including a step of heat-treating the humic acid-derived foam at a second heat treatment temperature higher than said first heat treatment temperature for a length of time sufficient for obtaining a graphitic foam wherein said pore walls contain stacked hexagonal carbon atomic planes having an inter-planar spacing $d_{002}$ from 0.3354 nm to 0.36 nm and a content of non-carbon elements less than 2% by weight.

4. The process of claim 1, wherein said blowing agent is a physical blowing agent, a chemical blowing agent, a mixture thereof, a dissolution-and-leaching agent, or a mechanically introduced blowing agent.

5. The process of claim 1, which is a roll-to-roll process wherein said steps (a) and (b) include feeding said supporting substrate from a feeder roller to a deposition zone, continuously or intermittently depositing said humic acid dispersion onto said surface of said supporting substrate to form said wet layer of humic acid thereon, drying said wet layer of humic acid to form the dried layer of humic acid, and collecting said dried layer of humic acid deposited on said supporting substrate on a collector roller.

6. The process of claim 1, wherein said first heat treatment temperature is from 100° C. to 1,500° C.

7. The process of claim 3, wherein said second heat treatment temperature includes at least a temperature selected from (A) 300-1,500° C., (B) 1,500-2,100° C., and/or (C) 2,100-3,200° C.

8. The process of claim 3, wherein said second heat treatment temperature includes a temperature in the range of 300-1,500° C. for at least 1 hour and then a temperature in the range of 1,500-3,200° C. for at least 1 hour.

9. The process of claim 3, wherein said non-carbon elements include an element selected from the group consisting of oxygen, fluorine, chlorine, bromine, iodine, nitrogen, hydrogen, and boron.

10. The process of claim 3, wherein said step (c) of heat treating the dried layer of humic acid at said first heat treatment temperature is conducted under a compressive stress.

11. The process of claim 1, further comprising a compression step to reduce a thickness, a pore size, or a porosity level of said foam.

12. The process of claim 3, wherein said first and/or second heat treatment temperature contains a temperature in the range of 300° C.-1,500° C. and the foam has an oxygen content or non-carbon content less than 1%, and pore walls having an inter-planar spacing less than 0.35 nm, a thermal conductivity of at least 250 W/mK per unit of specific gravity, and/or an electrical conductivity no less than 2,500 S/cm per unit of specific gravity.

13. The process of claim 3, wherein said first and/or second heat treatment temperature contains a temperature in the range of 1,500° C.-2,100° C. and the foam has an oxygen content or non-carbon content less than 0.01%, pore walls having an inter-planar spacing less than 0.34 nm, a thermal conductivity of at least 300 W/mK per unit of specific gravity, and/or an electrical conductivity no less than 3,000 S/cm per unit of specific gravity.

14. The process of claim 3, wherein said first and/or second heat treatment temperature contains a temperature greater than 2,100° C. and the foam has an oxygen content or non-carbon content no greater than 0.001%, pore walls having an inter-planar spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

15. The process of claim 3, wherein said first and/or second heat treatment temperature contains a temperature no less than 2,500° C. and the foam has pore walls containing stacked hexagonal carbon planes having an inter-planar spacing less than 0.336 nm, a mosaic spread value no greater than 0.4, a thermal conductivity greater than 400 W/mK per unit of specific gravity, and/or an electrical conductivity greater than 4,000 S/cm per unit of specific gravity.

16. The process of claim 1, wherein said humic acid-derived foam or combined humic acid/graphene-derived foam has a density from 0.005 to 1.7 $g/cm^3$, a specific surface area from 50 to 3,200 $m^2/g$, a thermal conductivity of at least 100 W/mK per unit of specific gravity, and/or an electrical conductivity no less than 500 S/cm per unit of specific gravity.

17. A process for producing sulfur cathode for a metal-sulfur battery, said process comprising:

(a) preparing a humic acid dispersion having multiple humic acid molecules and optional graphene sheets dispersed in a liquid medium, wherein said humic acid is selected from the group consisting of oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, and a combinations thereof;

(b) dispensing said humic acid dispersion onto a surface of a supporting substrate to form a wet layer of humic acid and partially or completely removing said liquid medium from the wet layer of humic acid to form a dried layer of humic acid, wherein said dispensing optionally includes an orientation-inducing stress;

(c) heat treating the dried layer of humic acid at a first heat treatment temperature from 80° C. to 3,200° C. at a desired heating rate sufficient to induce volatile gas molecules from non-carbon elements for producing a humic acid-derived foam, wherein pore walls of said humic acid-derived foam contain single-layer or few-layer humic acid-derived hexagonal carbon atomic planes, said few-layer hexagonal carbon atomic planes have 2-10 layers of stacked hexagonal carbon atomic planes having an inter-plane spacing $d_{002}$ from 0.3354 nm to 0.60 nm as measured by X-ray diffraction, and said single-layer or few-layer hexagonal carbon atomic planes contain 0.01% to 25% by weight of non-carbon elements;

(d) optionally heat-treating the humic acid-derived foam at a second heat treatment temperature higher than said first heat treatment temperature for a length of time sufficient for obtaining a graphitic foam wherein said pore walls contain stacked hexagonal carbon atomic planes having an inter-planar spacing $d_{002}$ from 0.3354 nm to 0.36 nm and a content of non-carbon elements less than 2% by weight;

(e) optionally comprising a compression step during or after a heat treatment step to reduce a thickness, a pore size, or a porosity level of said humic acid-derived foam; and (f) impregnating said foam with sulfur or sulfide in a form of thin particles or coating, having a diameter or thickness less than 500 nm, which are lodged in said pores or deposited on said pore walls.

* * * * *